United States Patent
De et al.

(10) Patent No.: US 11,243,983 B2
(45) Date of Patent: Feb. 8, 2022

(54) SYSTEM AND METHOD FOR COMPACT STORAGE AND EFFICIENT RETRIEVAL OF ACCESS POINT INFORMATION FOR DETECTING ROGUE ACCESS POINTS

(71) Applicant: QUALCOMM Incorporated, San Diego, CA (US)

(72) Inventors: Subrato Kumar De, San Diego, CA (US); Dineel Diwakar Sule, San Diego, CA (US); Nabeel Al-Saber, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 16/164,498

(22) Filed: Oct. 18, 2018

(65) Prior Publication Data

US 2019/0130019 A1    May 2, 2019

Related U.S. Application Data

(60) Provisional application No. 62/578,964, filed on Oct. 30, 2017, provisional application No. 62/578,975, filed on Oct. 30, 2017.

(51) Int. Cl.
*G06F 16/28* (2019.01)
*H04L 29/12* (2006.01)
(Continued)

(52) U.S. Cl.
CPC ............ *G06F 16/285* (2019.01); *G06F 16/95* (2019.01); *H04L 61/6004* (2013.01);
(Continued)

(58) Field of Classification Search
CPC ....... H04W 12/1202; H04W 12/00524; H04W 84/042
See application file for complete search history.

(56) References Cited

U.S. PATENT DOCUMENTS

2006/0200843 A1* 9/2006 Morgan ................ H04W 4/029
725/80
2009/0019531 A1* 1/2009 Rosenberger ......... H04W 12/06
726/4

(Continued)

OTHER PUBLICATIONS

International Search Report and Written Opinion—PCT/US2018/058033—ISA/EPO—dated Dec. 13, 2018.
International Preliminary Report on Patentability for PCT Application No. PCT/US2018/058033, dated May 14, 2020, 19 pages.

*Primary Examiner* — Hosain T Alam
*Assistant Examiner* — Anthony G Gemignani
(74) *Attorney, Agent, or Firm* — Procopio, Cory, Hargreaves & Savitch LLP

(57) ABSTRACT

Systems, devices, and methods for communications among access points (APs) and mobile wireless devices are disclosed. A database having a persistent profile table (PPT) can be used to store information related to access point operations. Information related to a plurality of APs can be detected and stored in the PPT. Certain information may be common to multiple of the APs, allowing for compression of the data for more efficient storage. Fingerprint data related to the APs can be clustered based on a first order identifier (e.g., SSID, PLMN) and a second order identifier (e.g., MAC, MAC prefix, cell ID). The clusters can be further compressed by, for example, storing common features only once, and storing uncommon features individually, along with an identifier frame indicating which features are unique within the group of clusters. A mobile device can query the persistent profile table to verify the identity of unknown APs.

26 Claims, 9 Drawing Sheets

(51) Int. Cl.
*H04L 29/08* (2006.01)
*G06F 16/95* (2019.01)
*H04W 48/16* (2009.01)
*H04W 12/79* (2021.01)
*H04W 12/122* (2021.01)
*H04W 88/08* (2009.01)
*H04W 84/04* (2009.01)

(52) U.S. Cl.
CPC ...... *H04L 61/6022* (2013.01); *H04L 67/1097* (2013.01); *H04W 12/122* (2021.01); *H04W 12/79* (2021.01); *H04W 48/16* (2013.01); *H04W 84/042* (2013.01); *H04W 88/08* (2013.01)

(56) References Cited

U.S. PATENT DOCUMENTS

| | | | |
|---|---|---|---|
| 2009/0135784 A1* | 5/2009 | Horn | H04W 36/0055 370/331 |
| 2009/0245176 A1* | 10/2009 | Balasubramanian | H04W 48/20 370/328 |
| 2011/0249610 A1* | 10/2011 | Ho | H04W 28/06 370/315 |
| 2012/0294231 A1* | 11/2012 | Finlow-Bates et al. | H04W 48/14 370/328 |
| 2016/0127931 A1* | 5/2016 | Baxley | G01S 5/0263 455/67.16 |
| 2016/0234751 A1* | 8/2016 | Golaup | H04W 36/14 |
| 2017/0026859 A1 | 1/2017 | Ahmadzadeh | |

* cited by examiner

SYSTEM AND METHOD FOR COMPACT STORAGE AND EFFICIENT RETRIEVAL OF ACCESS POINT INFORMATION FOR DETECTING ROGUE ACCESS POINTS

CROSS-REFERENCE TO RELATED APPLICATION

This application claims priority to U.S. Provisional Application No. 62/578,975, filed Oct. 30, 2017, entitled "SYSTEM AND METHOD FOR DETECTING ROGUE ACCESS POINTS," and to U.S. Provisional Application No. 62/578,964, filed Oct. 30, 2017, entitled "SYSTEM AND METHOD FOR ON-DEVICE COMPACT CACHING OF ACCESS POINT FINGERPRINTS," the contents of which are hereby incorporated by reference in their entirety.

BACKGROUND

Technical Field

This disclosure relates to systems and methods for storing data related to a known wireless access points (APs). More specifically, this disclosure relates to compact and optimized storage of feature vectors stored as fingerprint data denoting groups of similar wireless APs.

Related Art

The motivation for the compact storage of these fingerprint data is to facilitate efficient storage on a wireless device, but can be also applicable for compact storage in cloud based storage. The term "access point" or "AP" may be used herein to generally refer to a base station (BS) or AP in any wireless communication network. Accordingly, an "AP" can also refer to WiFi APs, Cellular Base Stations, BTS, NodeB, eNodeB, gNodeB (5G's eNodeB), base stations in Cellular IoT standards like NB-Iot, Cat-M, Femto Cells, Pico Cells, etc., as needed for a wireless communication system.

Some communication systems implement robust wireless networks spanning a large geographical area. In a system incorporating multiple antennas on multiple buildings, for example, an associated wireless network may span the entirety of the geographical area occupied by the multiple buildings. Some cellular operators have vast networks of BSs (e.g., cellular base stations) spread over large geographical areas. This can require the use of many wireless APs for wireless connectivity, such as cellular service (e.g., 3GPP and related standards) or WiFi, (e.g., one of the IEEE 802.XX families of wireless communication protocols).

In a wireless network including a significant number of wireless APs, the respective wireless transmitter may be numbered or named. Thus after repeated connections, the APs may be known and trusted. This provides a degree of confidence in the security the wireless network. In some examples, an AP that is not associated with the company's wireless network or not associated with a particular cellular operator may be operable to spoof the wireless network or a cell tower of an operator in order to breach security or similar. Such a "rogue AP" may be an AP set up to gain access to data stored on a user device (e.g., a computer, wireless communication device) or company data via the user device. The rogue AP is thus contrasted with a trusted AP that is legitimately associated with the wireless network. The rogue AP can spoof network settings or names in order lure users to connect the user device to the rogue AP and breach network security, for example.

Identification of rogue APs can require storing long communication histories and large amounts of data related to the expected behavior of the trusted access points. Such storage can be facilitated by storing "fingerprints" or "fingerprint data" of the known, trusted, or good APs (e.g., WiFi APs or cellular BSs). This approach can provide some protection against rogue APs using the previously seen and recorded AP fingerprints. Some of the fingerprint data can be crowd-sourced and stored to a cloud computing system to allow wide access and detection of zero-day rogue access point attacks. The fingerprint data may be stored to a database or memory, referred to herein as a persistent profile table (PPT). The PPT may also be referred to as a profile table. The persistent profile table can be a data structure stored in memory storing clusters of fingerprint data associated with wireless APs.

Such a fingerprint database can be extremely large, compiling hundreds or thousands or even millions of fingerprints of APs, for example. However, searching such a database for a rogue AP/BS can be process and time intensive. A database can reach a point where its size makes it unusable. A WiFi AP or cellular BS fingerprint database should be a scalable and allow fast and efficient identification of wireless AP fingerprints and behavior history. Such a fingerprint database may also be optimized for size to save storage space and data connection bandwidth for cloud access.

SUMMARY

In general, this disclosure describes systems and methods related to storing and classifying wireless Aps or BSs, and enabling remote access to the stored data, allowing detection and identification of a rogue BS/AP. The systems, methods and devices of this disclosure each have several innovative aspects, no single one of which is solely responsible for the desirable attributes disclosed herein.

One aspect of the disclosure provides a method for communication among a wireless mobile device and a plurality of access points. The method can include receiving at a server, and storing to a memory, identification data related to a plurality of known access points, the identification data for each known access point of the plurality of known access points including a first order identifier, a second order identifier, and feature set data representing one or more operating characteristics. The method can include classifying, by the server, the identification data as a plurality of clusters based on a commonality of the first order identifier, and at least a portion of the second order identifier. The method can include generating, at the server, a compact feature set for each cluster of the plurality of clusters in memory based on common operating characteristics of the known access points within individual clusters. The method can include storing, at the server, a representation of common compact feature sets across clusters as a compact table entry. The compact table entry can have an identifier frame indicating the one or more common operating characteristics among the known access points in each cluster. The compact table entry can have a compressed feature set indicating one or more features uncommon among the known access points in each cluster. The method can include receiving, at the server, a prefetch request from the wireless mobile device identifying a new geographic location. The method can include providing the wireless mobile device identification data related to access points in the new geographic location.

Another aspect of the disclosure provides a device for communication among a wireless mobile device and a plurality of access points. The device can have a memory operable to store identification data related to a plurality of known access points, the identification data for each known access point of the plurality of known access points including a first order identifier, a second order identifier, and feature set data representing one or more operating characteristics. The device can have one or more processors communicatively coupled to the memory. The one or more processors can classify the identification data as a plurality of clusters based on a commonality of the first order identifier, and at least a portion of the second order identifier. The one or more processors can generate a compact feature set for each cluster of the plurality of clusters in the memory based on common operating characteristics of the known access points within individual clusters. The one or more processors can store a representation of common compact feature sets across clusters as a compact table entry. The compact table entry have an identifier frame indicating the one or more common operating characteristics among the known access points in each cluster. The compact table entry have a compressed feature set indicating one or more features uncommon among the known access points in each cluster. The one or more processors can receive a prefetch request from the wireless mobile device identifying a new geographic location. The one or more processors can provide the wireless mobile device identification data related to access points in the new geographic location.

Another aspect of the disclosure provides a non-transitory computer-readable medium in a communications system for communications among a wireless mobile device and a plurality of access points comprising instructions. The instructions can cause a computer to receive identification data related to a plurality of known access points, the identification data for each known access point of the plurality of known access points including a first order identifier, a second order identifier, and feature set data representing one or more operating characteristics. The instructions can cause a computer to classify the identification data as a plurality of clusters based on a commonality of the first order identifier, and at least a portion of the second order identifier. The instructions can cause a computer to generate a compact feature set for each cluster of the plurality of clusters in the memory based on common operating characteristics of the known access points within individual clusters. The instructions can cause a computer to store a representation of common compact feature sets across clusters as a compact table entry. The compact table entry can have an identifier frame indicating the one or more common operating characteristics among the known access points in each cluster. The compact table entry can have a compressed feature set indicating one or more features uncommon among the known access points in each cluster. The instructions can cause a computer to receive a prefetch request from the wireless mobile device identifying a new geographic location. The instructions can cause a computer to provide the wireless mobile device identification data related to access points in the new geographic location.

Another aspect of the disclosure provides a method for communication among a wireless mobile device and a plurality of access points. The method can include transmitting a request from the wireless mobile device to a server identifying a new geographic location. The method can include receiving identification data related to a plurality of known access points associated with the new geographic area from the server. The identification data can be compressed and grouped as a plurality of clusters based on a commonality of a first order identifier, and at least a portion of a second order identifier of the plurality of known access points. The identification data can be compressed and grouped as at least one compact table entry associated with the plurality of clusters, the at least one compact table entry. The at least one compact table entry can have an identifier frame indicating one or more common operating characteristics among the known access points in each cluster. The at least one compact table entry can have a compressed feature set indicating one or more features uncommon among the known access points in each cluster. The method can include identifying a suspect access point in the new geographic area, the suspect access point being unknown to the mobile device. The method can include comparing a first order identifier of the suspect access point, at least a portion of a second order identifier of the suspect access point, and a representation of one or more operating characteristics associated with the suspect access point identification data. The method can include identifying the suspect access point as a trusted access point based on the comparing.

Other features and advantages of the present disclosure should be apparent from the following description which illustrates, by way of example, aspects of the disclosure.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

Figure 1:
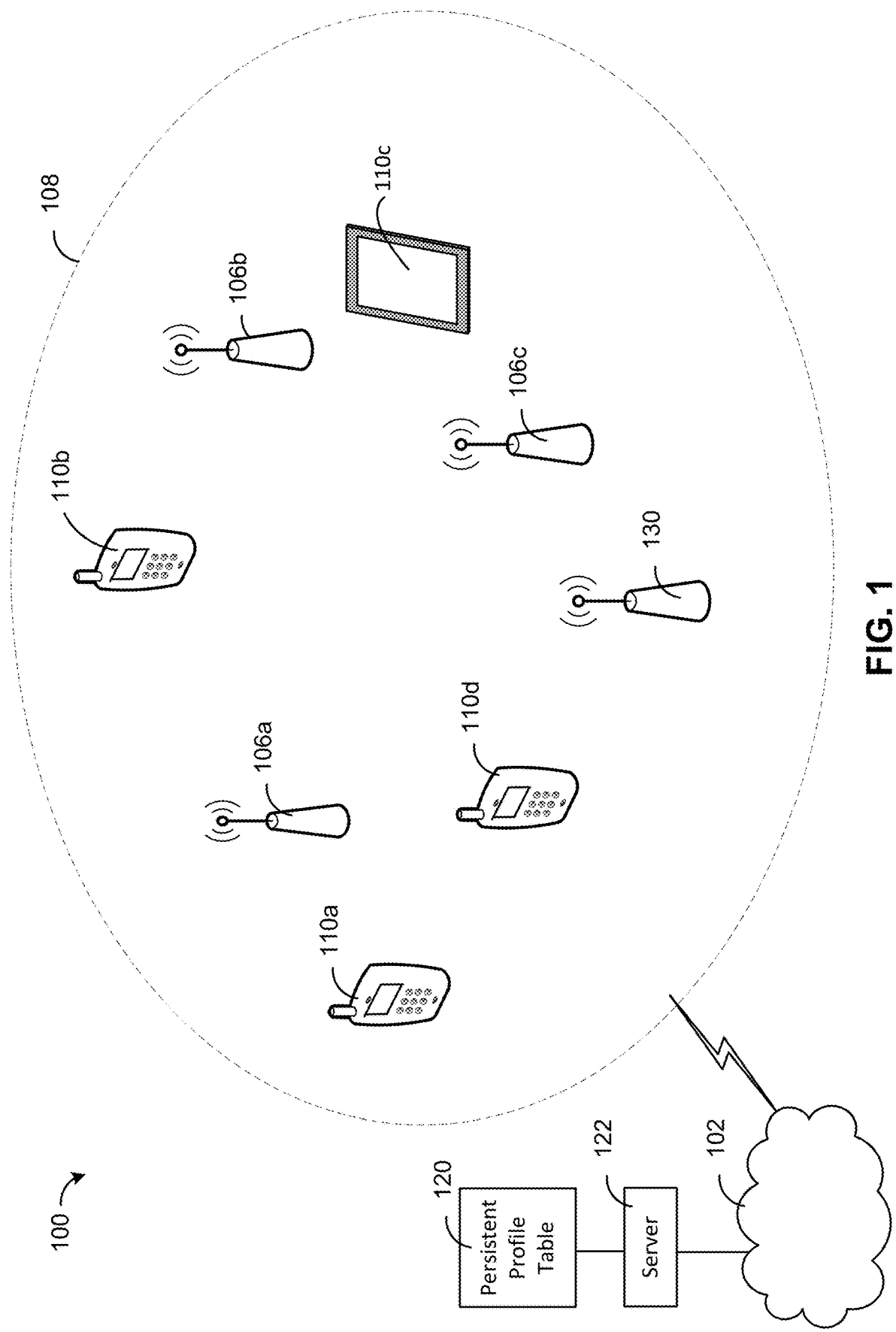
FIG. 1 is a functional block diagram of an exemplary wireless communication system.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Large wireless networks can have many APs and be susceptible to certain attacks, such as the spoofing of the network by a rogue (e.g., unauthorized) AP. In order to prevent breaches, user devices need the capability to identify, report, and ignore rogue APs, for example. A rogue WiFi node can be an access point that has been installed in the network or is within the coverage area of the network without authorization from the network and/or that is not in communication with the WiFi network. Rogue or uncontrolled interfering nodes (e.g., WiFi access point) can degrade the performance of a WiFi network. Fingerprint data, or fingerprints, for known APs can be used in various algorithms based on, for example, machine learning (ML), or logistic, heuristic, or expert analytics, or expert systems to classify good versus malicious or rogue wireless APs. Expert analytics can include a statistical analysis and data mining operations that enable construction of predictive models used to discover hidden insights and relationships in the received data, and then make predictions about the new received data. Some embodiments can implement expert analytics or expert systems on the fingerprints received from the unknown AP to determine if the unknown AP is good or bad.

This disclosure provides systems and methods allowing storage and retrieval of the WiFi or cellular AP fingerprint data stored in clusters to provide an efficient and effective ML (or other algorithm-based solutions) allowing a wireless device efficiently store fingerprint data and quickly identify a rogue AP. As used herein, fingerprint data can include, but is not limited to various identifiers (e.g., MAC address, SSID, PLMN, cell ID, etc.) and operating characteristics (e.g., frequency band, signal strength, etc.) of individual APs. The fingerprint data can have 20 or more individual features and can describe typical behaviors associated with specific APs.

For example, the fingerprint data for WiFi APs can include various identifiers, such as SSID, MAC address, and/or a MAC prefix, in addition to various operating characteristics such as transmit/receive frequencies and associated variations, beacon interval variation, robust security network (RSN) capabilities, clock skew, Management Frame Info, Sequence numbers, Information derived from Information Elements (IE), etc. Fingerprint data for cellular BSs (e.g., cellular APs) can include various identifiers (e.g., PLMN, cell ID, etc.) and operating characteristics and system parameters for the cellular towers contained in master information blocks (MIB) and system information blocks (SIB), neighboring cell tower information, operating frequency bands, physical cell identification (ID), latitude/longitude/location information, tracking or location area codes, reselection priority values, information about primary synchronization signal (PSS) and secondary synchronization signal (SSS), and other information related to signal strength and characteristics, modulation, frequency, etc.

FIG. 1 is a functional block diagram of an exemplary wireless communications system. A wireless communications system (system) 100 can represent a wireless local area network (WLAN) or a wireless wide area network (WWAN) for example. The system 100 can have a plurality of APs 106. The APs 106 are individually labeled 106a, 106b, 106c and may be referred to collectively as the APs 106. Three APs 106 are shown in the system 100, however this is not limiting on the disclosure as any number of APs 106 may be implemented. In some embodiments, the APs 106a, 106b, 106c can be implemented as APs for one of a variety of wireless communication protocols, such as WiFi APs or cellular BSs (e.g., nodeB (NB) as in 3G, evolved NB (eNB) as in 4G, or next generation NodeB (gNB) as in 5G). The BS's can also be implemented as base transceiver stations (BTS) as in GSM, GERAN, and EDGE networks, for example. The APs 106 may also be referred to as trusted APs. "Trusted" in this sense can be contrasted with "rogue," suspect, or untrusted APs. As used herein, a trusted AP is one that is an official component of an established network or otherwise an authorized member of the system 100. Unknown or suspect APs may not be authorized or may be part of the authorized network, but not yet known or recorded as part of the network. Rogue APs may be implemented to breach certain security protocols of the system 100.

The system 100 can have one or more wireless communication devices (mobile devices) 110. The mobile devices 110, labeled individually as mobile devices 110a, 110b, 110c, can be just a few of a large plurality of wireless communication devices operating within the system 100 in association with the APs 106. The mobile devices 110a, 110b, 110c may be collectively referred to herein as the mobile devices 110, or generically as the mobile device 110. The mobile devices 110 can also be referred to as a user equipment (UE), mobile terminal, or other similar mobile or wireless electronic devices for use in the system 100.

Each of the APs 106 can provide wireless services to the system 100 within a network 108, communicatively coupling each of the mobile devices 110, or providing access to another, larger wide area network (WAN) 102, such as the Internet. In an embodiment, the system 100 may correspond to a business that has a plurality of buildings or structures, for example. Each of the structures can have one or more APs 106 to establish a coverage area and provide services to all of the mobile devices 110 within the network 108. In another embodiment, the system 100 can also comprise a cellular operator with coverage in a given geographical area. Thus each of the APs 106 can be implemented as a cellular tower or BS.

Each of the mobile devices 110 can freely connect, disconnect, or handover from one AP 106 to another. For example, if the mobile device 110a is connected to the AP 106a, it moves into a part of the network 108 (e.g., from one structure to another) in which the AP 106c may have a stronger signal (e.g., received signal strength), the mobile device 110a can handover to the AP 106c.

The mobile device 110a (as with the other mobile devices 110) can store information (e.g., the fingerprint data) related to the APs 106. In a system implementing WiFi communication protocols (e.g., the system 100), the fingerprint data can include, for example, the network name, media access control (MAC) address, service set identifier (SSID), public land mobile network code (PLMN or PLMN code), cell ID, environmental contextual information, location information, etc. In embodiments of the system incorporating cellular communication protocols and, for example, an eNB as the APs 106, the PLMN code may be recorded or stored in lieu of the SSID, and a cell ID may be stored in lieu of the MAC address. The PLMN can have, for example, a mobile country code (MCC) and a mobile network code (MNC). Other features and types of fingerprint data are described below in connection with the following figures. In some embodiments, the SSID or PLMN can be a first order identifier, indicating, for example, a network name of a given AP 106. Similarly, the MAC address/prefix or PLMN code can be a second order identifier of the given AP 106. These specific first/second order identifiers are exemplary and are not limiting on the disclosure.

This data collection can allow the mobile devices 110 to dispense with scanning or listening for various beacons or other broadcast information from the available APs 106 in order to connect to the network 108. If the mobile device 110a, for example, encounters a stronger received signal strength from the AP 106c than the AP 106a, the previously stored network information, or fingerprint data, for the AP 106c may make such a handover faster, secure, and more efficient. The mobile devices 110 can further query such fingerprint data to confirm the identity of the AP 106 to which the mobile device 110 wishes to connect. The mobile devices 110 can implement certain ML or other algorithm-based processes that use the fingerprint data associated with each of the APs 106.

The fingerprint data for the APs 106 can be stored in a persistent profile table (PPT) 120. The PPT 120 can be a local or a distributed or cloud-based memory or supporting server(s) that allow the mobile devices 110 to store and update fingerprint data related to the APs 106. In some embodiments, the PPT 120 can be partitioned or otherwise separated to allow each of the mobile devices 110 to store fingerprint data. In some other embodiments, the PPT 120 can have a memory or database to which each mobile device 110 can store fingerprint data. The PPT 120 can further be searchable by all of the mobile devices 110. Such fingerprint data can be gleaned from various scans or other encounters between the mobile devices 110 and the APs 106. The PPT 120 is shown as cloud-based storage accessible via the WAN 102 (e.g., the Internet) by the mobile devices 110 and the APs 106 within the system 100. In some embodiments, each of the mobile devices 110 can have a version or a portion of the PPT 120 stored in a local memory.

In some embodiments, an unknown AP 130 can appear within the network 108. The unknown AP 130 can be a rogue AP, for example, intended to spoof the network 108 and gain access to the system 100. In some examples, the system 100 may be a corporation having significant amounts of sensitive information stored within the network 108 (e.g., in various memories or servers coupled to the network). The unknown AP 130 may be a security threat intended to aid in gathering data about the network 108 so as to breach certain security protocols of the system 100. The unknown AP 130 may also be referred to herein as a "suspect" AP as its status as a trusted AP or a rogue AP is yet to be determined.

The unknown AP 130 may have one or more of the same SSID, PLMN, network name, cell ID, MAC address, or MAC prefix as the APs 106. The unknown AP 130 may also share some of the same features or operating characteristics as the APs 106. This may also be referred to herein as "having a similar fingerprint." However, the unknown AP 130 may not have all of the same fingerprint data. Differences in the fingerprint data can be used to discriminate trusted APs from untrusted APs, and otherwise identify rogue APs. Accordingly, should the mobile devices 110 encounter the unknown AP 130, the mobile devices 110 can query the PPT 120 to determine whether the fingerprint data of the unknown AP 130 matches or is similar to any entries in the PPT 120. If the fingerprint data of the unknown AP 130 matches the PPT 120, then it is a trusted AP. If it is determined that the fingerprint data of the unknown AP 130 does not fit the fingerprint of the APs 106 or an entry in the PPT 120, then it can be ignored or otherwise flagged as a rogue AP. In some embodiments, the rogue AP can be further evaluated using certain on-device algorithms, which may be based on machine learning approaches. In some embodiments, the mobile devices 110 may receive or display alerts based on the identification of a rogue AP. The alerts can, for example, indicate (e.g., to a user) that a selected AP (e.g., the unknown AP 130) has not been previously encountered within the network 108, cannot be identified within the PPT 120, or has suspicious fingerprint data.

Ethernet devices, which have become the dominant network interface type, can each programmed with a unique 48-bit identifier referred to as a MAC address. This address is placed in Ethernet headers to identify which machine on a local network sent a packet, and for which machine the packet is destined. This can be represented as a hexadecimal (hex) string, such as 00:60:1D:38:32:90. To ensure that MAC addresses are unique in a world with thousands of vendors, the IEEE assigns an Organizationally Unique Identifier (OUI) to each company manufacturing Ethernet devices. The company must use its own OUI for the first three bytes of MAC addresses for equipment it produces. For example, the OUI of 00:60:1D:38:32:90 is 00601D. As used herein a MAC prefix can be an OUI. The MAC prefix can be a 24-bit number (e.g., three bytes). This can be the first three bytes in a standard MAC address.

In embodiments implemented using cellular technologies, PLMN and cell ID (global Cell ID) can be used to identify (e.g., identifiers) a specific cellular AP (e.g., BTS in 2G/GSM/GPRS/EDGE, NB in 3G/UMTS, eNB in LTE/4G, gNB in 5G) for a specific operator in a specific country. As noted above, the PLMN can have an MCC and an MNC. The MCC is country specific, and the MNC is operator specific. In addition, each cell in a cell tower (e.g., the APs 106) coverage area can have a unique global identifier referred to herein as the cell ID. Various, geographically separated cell towers can have similarly valued data fields when. For example, towers operated by the same cellular operator in the same country can have the same MCC and MNC codes within the fingerprint data. When the towers are in the same tracking area (TA) or location area (LA), they can have the same TA code, LA code, and reselection priorities, etc. In addition, a given cellular operator can configure their cell towers similarly with respect to various parameter settings like transmit frequency bands. Thus, various elements of the fingerprint data may overlap from tower to tower, BS to BS, or AP to AP.

Figure 2:
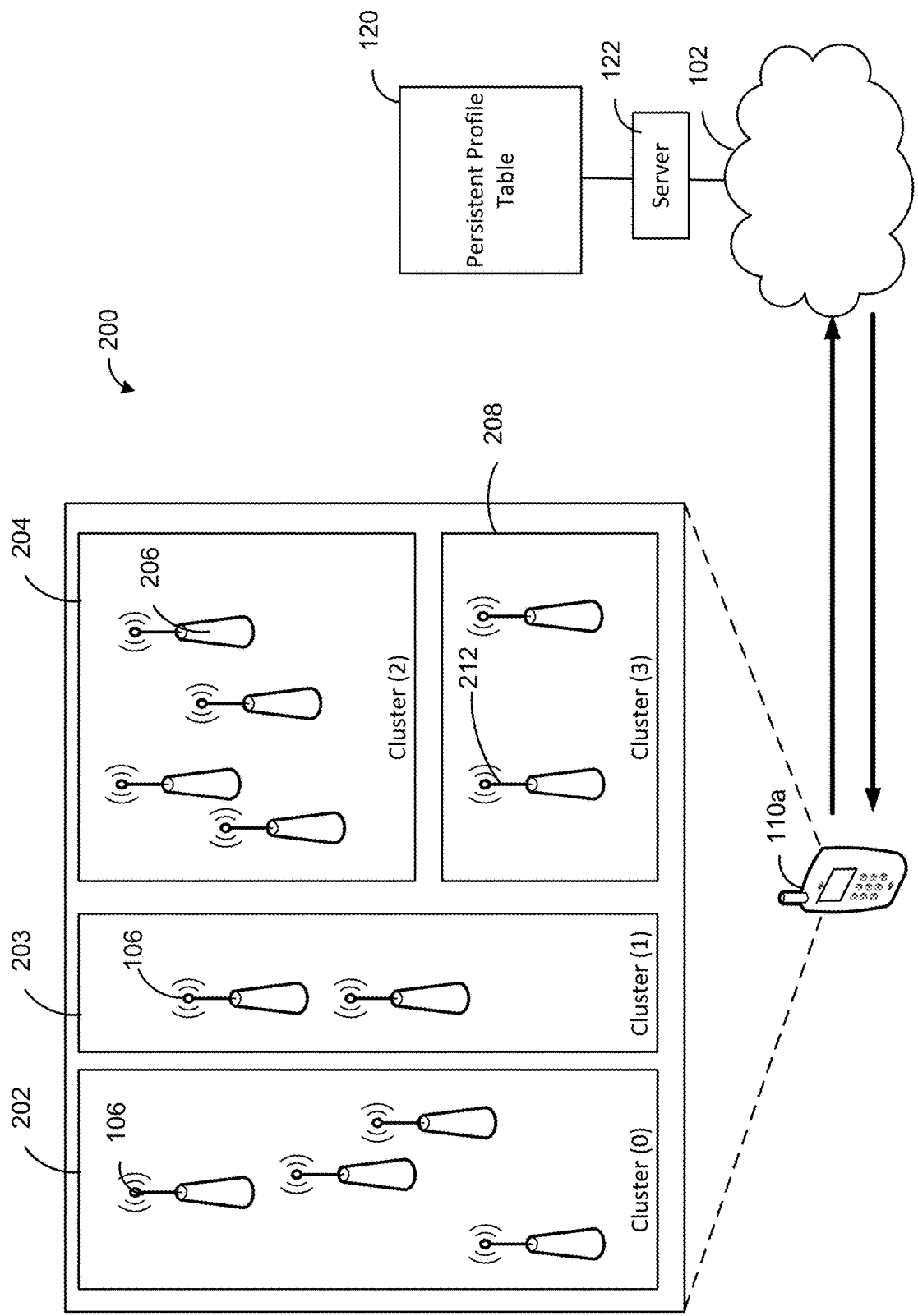
FIG. 2 is a functional block diagram of another exemplary wireless communication system.

FIG. 2 is a functional block diagram of another exemplary wireless communication system. The mobile device 110a, for example, can store information related to each and every AP (e.g., the APs 106) it encounters. Some or all of this information may be stored locally in the mobile device 110a. In some embodiments, such information can be pushed to, or otherwise stored within the PPT 120. This can save internal memory of the mobile device 110a. The PPT can also be shared with other mobile devices 110 to help crowdsource trusted AP fingerprints and provide zero day protection against rogue AP's. WiFi APs are cited as a primary example or use case herein. Therefore, the APs 106 may be described in terms of 802.XX wireless protocols. However, as noted above, this is not limiting on the disclosure. The systems and methods described herein are applicable in cellular communications or any wireless system incorporating similar kinds of identification numbers specific to a given network, transmitter, communication protocol, etc.

In some embodiments using WiFi communications, the APs 106 can be grouped and stored in clusters according to their respective fingerprints or fingerprint data. Such clusters can be based on, for example, one or more of their SSID, and MAC address or MAC prefix, and their respective operating characteristics or features. For example, a first cluster 202 can include a portion of the APs 106 of the network 108 (only one of the APs 106 is labeled for simplicity). A second cluster 203 (cluster (1)) can also be identified within the office having another portion of the APs 106. A third cluster 204, cluster (2) at the store, can have another grouping of APs 206 (only one of the APs 206 is labeled for simplicity). A fourth cluster 208, cluster (3) at the home, can have still another grouping of APs 212 (only one of the APs 212 is labeled for simplicity).

In this description of FIG. 2, the clusters 202, 203, 204, 208 are described in terms of the office, store, and home, respectively, however this is not limiting on the disclosure. In some embodiments, the clusters 202, 203, 204, 208 may be alternatively implemented as separate geographical areas for use in, for example, cellular communications. Thus, the clusters 202, 203, 204, 208 may alternatively be provisioned by a particular cellular operator and serve different geographical areas, rather than a home, office, or a store. In some embodiments, the granularity for the cellular networks can be comparable to WiFi networks when using femto- and pico-cells such as in an auditorium, stadium, etc.

The cluster 202 can be identified for use with the network 108 in an office, for example. The cluster 204 can be identified and then associated with a specific business, like a coffee shop or store. Similarly, the cluster 208 can be a home. Each of the clusters 202, 203, 204, 208 can have respective APs (e.g., the APs 106) having associated SSIDs, MAC prefixes, and/or operating characteristics. All of the APs 106 of the first cluster 202 may have the same manufacturer, and thus similar hardware profiles, MAC prefixes, SSID, and similar operating characteristics. The APs in the second cluster 203 (in the office) may have many of the same features as the APs 106 in the cluster 202, but have slight variations in, for example, operating characteristics or feature sets, so they are grouped in a different cluster. In the case of cellular APs (e.g., cellular BSs), then a cell ID and PLMN may be substituted for the MAC prefix and SSID, for example. This is described in more detail below.

Various operating characteristics may vary by small, but measurable amounts. All of this data, including minor disparities or operating ranges across the APs 106, 206, 212 can be stored to the PPT 120 in a feature vector or feature set. In the example of FIG. 2, fingerprint data from the six APs 106 in the clusters 202, 203, four APs 206 in the cluster 204, and two APs 212 in the cluster 208, for 12 total fingerprint data entries, can be stored in the PPT 120. In some embodiments, fingerprint data mismatches or differences between stored fingerprint data can trigger creation of the clusters by the server 122. In some embodiments, one or both of the server 122 and the mobile devices 110 can run such a ML algorithm that can discover and record or save data related to APs (e.g., fingerprint data) to the PPT 120. Thus, the clusters can be identified and created either by the server 122, or the mobile devices 110 detecting a mismatch in the PPT 120, identifying a cluster and propagating the associated information to the server 122.

Similarly, the mobile devices 110b, 110c can also store histories of ML—(or similarly) classified fingerprint data related to the APs 106 to the PPT 120. The fingerprint data can be categorized in clusters similar to the clusters 202, 204, 208, for example. The PPT 120 can thus capture typical behavior(s) associated with each of the APs 106, 206, 212. The PPT 120 can be updated continuously, incorporating information gleaned during fresh or new observations (e.g., within or outside the network 108) received at the mobile devices 110. The mobile device 110 can dynamically extend the coverage of the model provided by the fingerprint data stores within the PPT 120. In some examples, a detection engine within the mobile device 110 can continuously add newly discovered APs and their associated fingerprint data to the PPT 120. The detection engine can include, for example, the components within the mobile device 110 that perform AP scans such as a processor, digital signal processor (DSP), memory, etc. This can include updates to tolerance thresholds determined based on information related to fingerprint data in general or more specific operating characteristics. Thresholds can be defined based on training the ML algorithms (or other algorithms) to conform to a certain detection accuracy requirements and the acceptable false positives. So the algorithms are designed with a certain detection accuracy requirement and with a maximum allowed limit of false positives, and that sets the thresholds. This can further reduce false positives when searching or querying the PPT 120, given the large amount of information.

In embodiments, the PPT 120 can store multiple or repeated scans from the same SSID (of e.g., the APs 106) that can be averaged together and stored providing historical data related to a specific AP 106 or to the cluster 202, for example. In some embodiments, the PPT 120 can also store multiple clusters representing different or varying behaviors of the APs 106. In some embodiments, the PPT 120 can store fingerprints for may (e.g., thousands, millions, or even billions) of APs (e.g., the APs 106) grouped as clusters and is maintained in cloud-based memory. The PPT 120 can be accessed by the mobile devices 110 as needed, either stored locally or via the server 122.

All of the mobile devices 110 can provide fingerprint data related to clusters identified by the mobile device 110. The fingerprint data can then be stored at the PPT 120. Thus the PPT 120 can grow exponentially, containing extremely large amounts of information related to the APs 106, 206, 212, for example. Such a large database becomes very difficult and time consuming to search in order to determine the identity of the unknown AP 130, for example. Thus, the methods and systems disclosed herein for storing fingerprint data and searching the PPT 120 provide fast and efficient searching.

Figure 3:
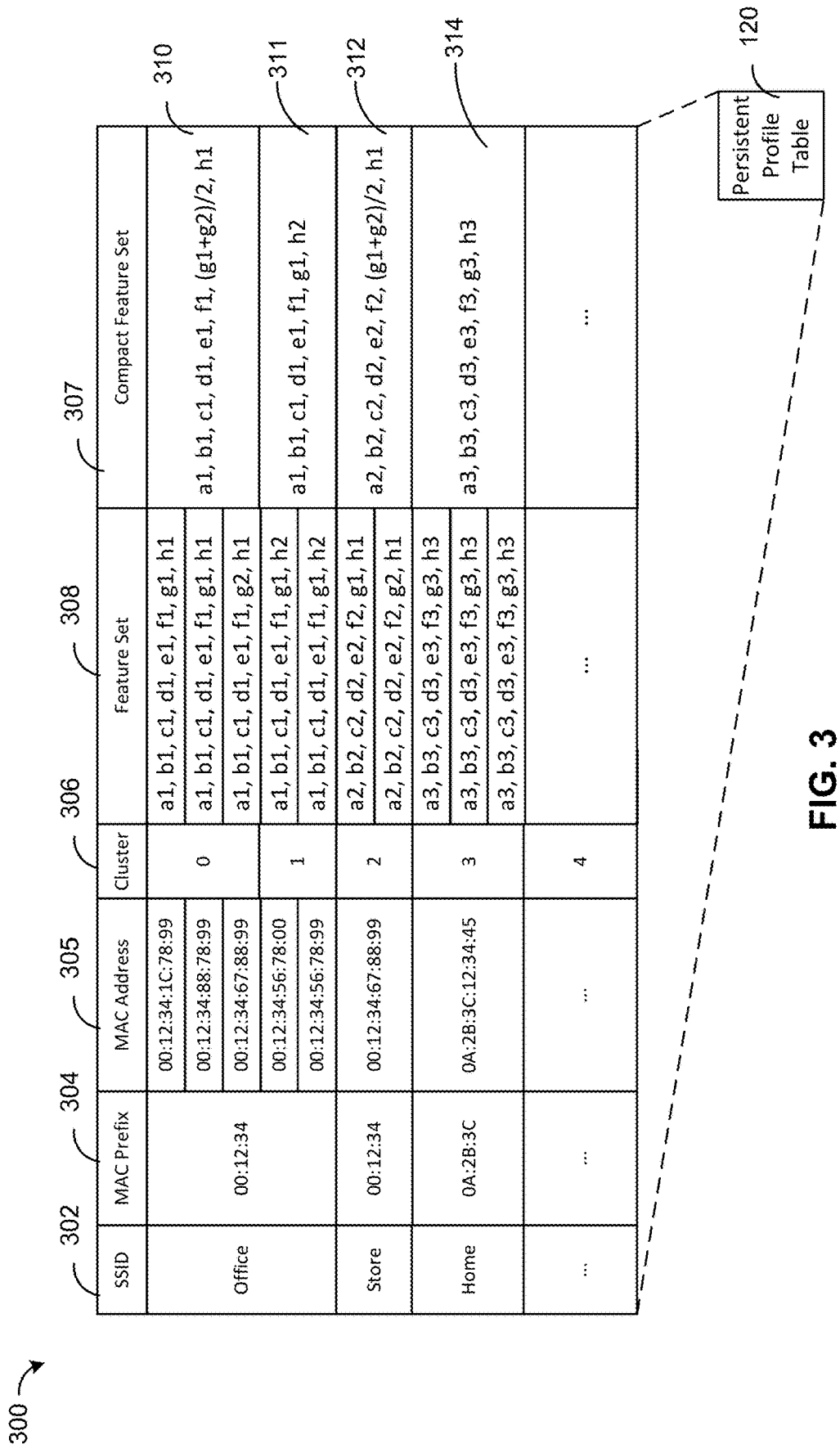
FIG. 3 is a graphical representation of an embodiment of the persistent profile table for storing fingerprint data of FIG. 2.

FIG. 3 is a graphical representation of an embodiment of the persistent profile table for storing fingerprint data of FIG. 2. A table 300 can represent the various pieces of information (identification data) related to the APs that can be stored within the PPT 120. Some or all of the data listed in the table 300 can be included in the PPT 120. In some embodiments, not all of the data shown and described herein may be present or stored to the PPT 120.

In some embodiments, each of the mobile devices 110 can continuously scan for available APs 106 (some which may be rogue APs), variance in the received signals, and various signal or AP characteristics. This can include the execution of a scan, probe requests, synchronization signals, system information blocks, or another detection algorithm. The detection algorithm can be implemented in the mobile devices 110 to detect and/or catalog information related to the APs 106. The detection algorithm can include the steps of the methods disclosed herein. Such methods can include collecting fingerprint data related to the plurality of APs, detecting new APs, and discriminating which APs are trusted and those that are not. The mobile device 110 can reference the fingerprint data stored in the PPT 120 and attempt to correlate the characteristics of the unknown AP 130, for example. If the characteristics and fingerprint data of the unknown AP 130 match an entry in the PPT 120, then it will be safe for the mobile device 110 to communicate with unknown AP 130. If not, then the unknown AP 130 can be an untrusted AP (e.g., a new association) or a rogue AP.

In some embodiments, certain thresholds may also be set. For example, the fingerprint data of the unknown AP 130 may not be an exact match to a stored FP. Thus, if the fingerprint data fall within certain established thresholds or tolerances of the recorded fingerprint data in the PPT 120, then it may be considered safe to connect with the unknown AP 130 (e.g., trusted AP). If the unknown AP 130 has variations (in, e.g., certain operating characteristics) that fall outside the tolerances recorded or set in the PPT 120, then the unknown AP 130 can be considered a rogue AP. The tolerances can be determined via statistical analysis performed by the server 122 (and, e.g., the mobile device 110) using various ML processes.

The features associated with feature value data that form the fingerprint of the APs 106 may be characteristic of the specific hardware and firmware components of the APs 106. Therefore, many of the features may be similar between the AP 106a and the AP 106b if built by the same manufacturer, for example. In some examples, there may be certain variations of feature values across different manufacturers, but the variations may lie within the limits of, for example, the relevant technology specifications (e.g., 3GPP and related standards, IEEE 802.XX families of standards, etc.).

In some embodiments, the mobile devices 110 can query the PPT 120 (e.g., via the server 122) to access the fingerprint data for the APs 106 via a MAC address 305 or a MAC prefix 304, together with a SSID 302. The MAC prefix 304 is described below. The SSID 302 and the MAC prefix 304 can form a "key" or "search key" that the mobile device 110a can use to search the PPT 120. This can allow a search for a specific AP or group of APs in a cluster (e.g., the cluster 202 of FIG. 2). If a query for a specific AP (e.g., the AP 106c) is needed, then a full MAC address 305 may need to be identified to complete the search of the PPT 120. In some embodiments, the full MAC addresses 305 may also be stored in a separate location within the PPT 120. However, storing each MAC address 305 may be unnecessary and an inefficient use of memory. Accordingly, the full MAC addresses 305 may not be stored at all.

In some embodiments, the SSID 302, as used here, can be considered a first order identifier or a first order discriminator when clustering/storing or searching the AP FP data in the PPT 120. As multiple of the APs can have the same SSID but only a portion of those may have the same MAC prefix or MAC address, then data related to the APs identified in the PPT 120 can form a tree-like structure as described below. Accordingly, the MAC prefix 304 or the MAC address can be used as a second order identifier or second order discriminator when searching the PPT 120, for example. Additional identifiers or discriminators (third, fourth, etc.) can be implemented to cluster and/or search entries in the PPT 120.

In embodiments implementing cellular technologies, the block labeled SSID 302 can instead include the PLMN as a first order identifier, and the boxes labeled MAC prefix 304/MAC address 305 can include the cell ID and be used as a second order identifier.

In some embodiments, there may be redundancies in storing the fingerprint data for multiple APs 106. For example, in a WiFi application, the APs 106 can be built by the same manufacturer and therefore may have common values for some of the features in the fingerprint data in addition to the same MAC prefix. The fingerprint data can be grouped or clustered based on the redundancies to minimize the database (e.g., PPT 120) size. For example, a single MAC prefix 304 may represent a large group of APs 106 having similar fingerprint data. Therefore a cluster of MAC address prefixes 304 can accurately represent the average behavior of a large number of (WiFi) APs 106 from the same manufacturer using the fingerprint data. The APs 106 having similar or the same MAC addresses 305 can be clustered using the MAC prefix 304.

In other embodiments, instead of using a MAC address, cellular APs 106 can use a globally unique cell ID to identify cells for a particular cell tower or BS.

A global MAC address can be 48 bits and have of two parts, with the first three bytes indicating the manufacturer of the network interface card (NIC), for example. Thus, the MAC prefix 304 can be, for example, the first few hex digits (e.g., six digits) the MAC address. As shown, the MAC prefix 304 can be the first three hex character pairs or bytes of the complete MAC address 305. ML algorithms can collect, save, and cluster such fingerprint data from the AP's having the same MAC-prefix as they indicate the same manufacturer and can possibly be the product line.

Using the clusters, fingerprint data entries in the PPT 120 can be grouped based on the SSID 302 and MAC prefix 304 (e.g., manufacturer/OUI part within the MAC address) instead of the entire MAC address. In some embodiments, only the SSID 302, MAC prefix 304, and a compact feature set 307 may be stored in the PPT 120. This can minimize the database size required to store billions of complete AP fingerprints that would otherwise be based on or referenced to their respective full MAC addresses 305. This can provide faster online lookups within the PPT 120. This can also enable the PPT 120 to store a compact representation of identification data as a compact feature set 307 using a single common store for the same feature values found across multiple APs 106. In some other embodiments, the PPT 120 can separately store feature values that are different across the multiple compact feature sets 310, 311, 312, 314. Thus, even though the full MAC addresses 305 may not necessarily be used for storing or grouping individual AP fingerprint data, it may still be stored. In some embodiments, however, the full MAC addresses 305 may not be stored in the PPT 120. The process of forming the compact feature sets 307 can also be referred to as compact cluster creation from compaction through the two level hierarchy and averaging to create the compact clusters and compact feature sets 307.

In an embodiment, this can allow the mobile device 110a, using the example of FIG. 2, to store the clusters in smaller tables such as the table 300. For example, the cluster 202 can have a first compact feature set 310 associated with the office, for example. The cluster 204 can be stored as a second compact feature set 312 associated with a store, and the cluster 208 can become a third compact feature set 314 associated with the home. In some embodiments, the groupings of the APs 106, 206, 212 can be separated or referenced in more than one compact feature set, as dictated by variations in the fingerprint data. For cellular APs 106, the clusters with the fingerprints can be associated to different geographical regions at the WWAN scale (e.g., auditoriums, stadiums, towns, cities, counties, etc.). The fingerprint data for cellular towers with the same PLMN (e.g., first order identifier) but different cell IDs (e.g., second order identifier) can have similar values for some of the fingerprint items. So multiple fingerprint data sets from different cell towers with the same PLMN code, but different cell ID, can be grouped/clustered together. The fingerprint data for cellular can include one or more of the following features: different system parameters found in the MIB and the SIB, the list of neighboring cell towers, the operating frequency bands, physical cell ID, latitude/longitude/location information, tracking or location area codes, reselection priority values, values in the PSS and SSS, information related to signal strength and characteristics, modulation, frequency, etc. These features can be same for multiple cell towers, each having different xell ID's, but the same PLMN code. Common values from one tower (e.g., AP) to the next provides ample ability to perform compaction or compression of the FP data.

As shown in the table 300, the PPT 120 can, for example, store feature sets 308 (or feature vectors) having a plurality of feature values for each AP 106. The feature values shown in FIG. 3 are represented as individual letters with a corresponding number. In some embodiments implementing 802.XX WiFi standards, the letters can represent characteristics such as, SSID, MAC prefix, beacon_interval_variation_same_ssid; AP_capability_bitmap; RSN_capabilities; channel_report_IE_presence; clock_skew: num_of_available_IEs; BSS_load_IE_presence; total_information_element_size: and total_size_of_vendor_specific_IEs. Many other characteristics and/or feature values are possible. In some cellular embodiments the letters can represent, for example, PLMN code and cell ID, various fields of the system information blocks (SIBs), location or tracking area codes, cell reselection priorities, neighbor cells, location information, physical cell ID, tracking area identifier, various signal characteristics, etc. A single MAC address prefix 304 cluster can accurately represent the behavior of a large number of APs from the same manufacturer/operator. Similarly for cellular embodiments, a single PLMN can have multiple clusters, where each cluster can include multiple cell towers (e.g., APs 106) with very similar fingerprint data.

The feature sets 308 can include various characteristics discovered by the mobile devices 110 during a scan (e.g., a detection algorithm). The feature sets 308 can include, for example, features characteristic of the specific hardware or firmware of the AP 106. Many of the characteristics or features may be the same or similar across different access points built by the same manufacturer. In some examples, each feature value in the fingerprint can be precision floating point, requiring, for example, 64 bit storage.

As shown, the feature sets 308 of cluster 0 in the office, for example, there are slight variations within the features. The fingerprint 310 associated with cluster 0 can have a set of the common features among the APs associated with the cluster 0. In some embodiments, the features of the feature sets 308 in a given cluster may all be the same. The feature sets 308 can further have the same features, but different values (e.g., floating point values) within the thresholds or tolerances of the ML algorithm. In some embodiments, increased compaction of the data storage is possible where AP manufactures are same, then even for APs 106 having different SSIDs, up to 90% or more of the features (e.g., feature set 308) can be same across a number of APs. Thus, the compact feature sets 307 can be based on such commonalities across APs. This can provide significant memory savings when the data are combined or compacted based on common features.

However, in order to facilitate searching the vast database of the PPT 120, the APs 106 can be grouped by SSID 302, MAC prefix 304, and feature sets 308 or compact feature sets 307, for example. This can provide a smaller amount of data for storage and a simpler data set to query. In some embodiments, each listed SSID 302 can have multiple associated MAC prefixes 304. Similarly, each of the MAC prefixes 304 can have multiple groupings of feature sets 308. This arrangement can have a tree-like relationship. For example, the AP 106a and the AP 106b may have the same SSID 302 and the same MAC prefix 304. However, even if they are built by the same manufacturer, the complete MAC address 305 may be different. Further, the feature set 308 of the AP 106a and the AP 106b may be slightly different. However, clustering the AP 106a and the AP 106b into the cluster 202, for example, allows storage of a single a MAC prefix 304 and a single SSID 302 referenced to multiple APs 106 having similar feature sets 308. This can save considerable memory over saving individual MAC addresses, SSIDs, feature sets, etc. for each AP encountered. The APs 106 in the cellular applications can be grouped (e.g., compacted feature sets 308) based on PLMN, for example.

As shown in the table 300, cluster 0 for the cluster 202 in the office, has features a-h. The features a-h are common to each of the APs 106 in the office, but have slightly different feature values. In this example, the values for g are different, g1 and g2. Thus, in the fingerprint, and statistical average can be stored, representing the mean of the two values g1 and g2 (e.g., (g1+g2)/2). Other statistical methods, such as mean, median, average, can also be implemented for groups of different feature values. In this way, the various values for the feature "g" can be an aggregate of the multiple APs in the cluster 202. In some embodiments, the average or mean can be stored with deviation or standard deviation information related to various features (e.g., g1, g2). In another example, the stored (compact) feature value can be a center point value for a feature in a given feature set 308. Thus, analysis of the features of the unknown AP 130 may include an evaluation of the variation between such a center point value in the stored feature values, and the corresponding value(s) in the same features of the unknown AP 130. There may be multiple feature sets per SSID (in WiFi) or PLMN (for cellular), but may only be one compact feature set per cluster. Thus, the compact feature set 310 and the compact feature set 311 show the vector of feature values for a single SSID and MAC prefix, while the compact feature set 312 and the compact feature set 314 show the unique feature values per SSID and MAC prefix. A similar compact feature set can be formed for cellular APs 106, based on common features of multiple APs 106 in a PLMN, for example.

In other embodiments, vectors including all of the various, individual values (e.g., g1 and g2), can be stored, as opposed to only the statistical representations of the aggregate value sets. Other aspects such as confidence level, manufacturer, environmental context, location, typical signal strength, and client can also be included.

In some embodiments, the table 300 can be modified to use only the SSID 302 and MAC prefix 304 to cluster the feature sets 308 as shown.

Figure 4:
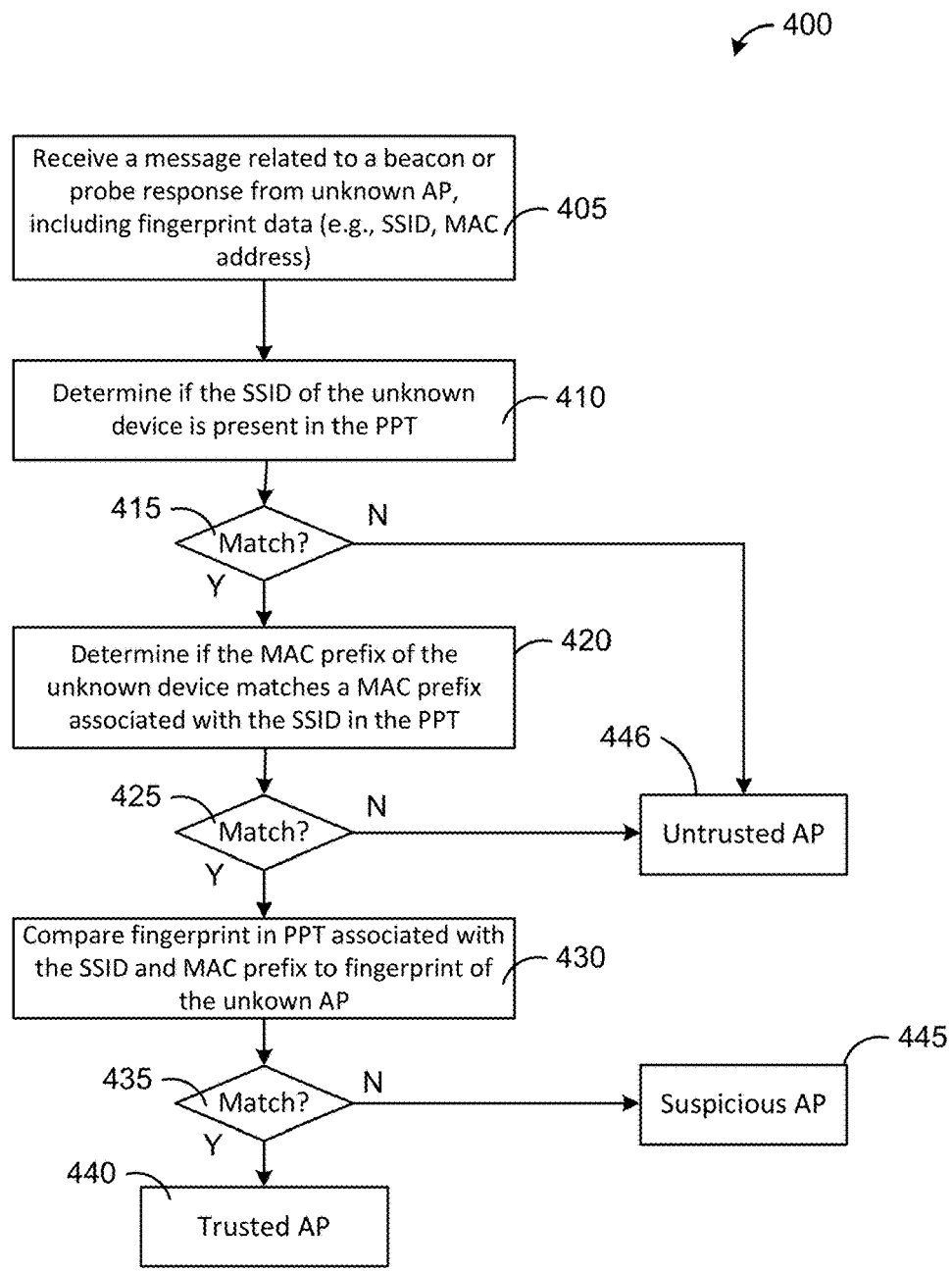
FIG. 4 is a flowchart of an embodiment of a method for identifying a rogue AP using the persistent profile table of FIG. 3.

FIG. 4 is a flowchart of an embodiment of a method for identifying a rogue AP using the persistent profile table of FIG. 3. This may be referred to herein as a detection algorithm operable to detect a rogue WiFi AP.

A method 400 can begin at block 405 when the mobile device 110a, scans for available APs. In WiFi embodiments, the mobile device 110a can receive a beacon, a probe response, or other message (e.g., broadcast, unicast, multicast) from the unknown AP 130. The probe response can be received in response to a probe request transmitted by the mobile device 110a. The beacon, for example, can include various data including a MAC address of the unknown AP 130, an SSID (e.g., the SSID 302) for the network, and a variety of features or characteristics that make up the feature set 308, for example. The mobile device 110 can then send a message to the server 122 for example, related to the received beacon. In embodiments using cellular APs 106, The mobile device 110 (e.g., a user equipment or UE) can receive primary and secondary synchronization signals (PSS, and SSS), master information block (MIB), various system information blocks (SIB), and other signals from the cellular APs 106.

At block 410, the server 122 can query the PPT 120 to determine if the SSID (or PLMN for cellular) included in the beacon is present in the PPT 120. In the event the unknown AP 130 is a rogue AP, the SSID may mimic that of the trusted APs (e.g., the APs 106) of the network 108. That is, the unknown AP 130 may have the same SSID as the trusted APs 106 in the network 108. The SSID can be used as a first order identifier when searching the PPT 120.

At decision block 415, if the SSID is present in the PPT 120, the server 122 can determine if the MAC prefix (e.g., the MAC prefix 304) of the unknown AP 130 is present in the PPT 120. As noted above, the MAC prefix 304 can be the first three bytes of the full MAC address. As the full MAC addresses are grouped based on the MAC prefixes 304, there may be many results from such a query. For example, a single SSID 302 can have multiple associated MAC prefixes 304.

At block 420, the server 122 can determine if the MAC prefix (e.g., the MAC prefix 304) of the MAC address of the unknown AP 130 is present in the PPT 120. For example, the MAC prefix of the unknown AP 130 may be associated with the SSID of block 410. In some examples, the APs 106 may have similar MAC addresses, but more than one MAC prefix may be present in the PPT 120 associated with the SSID. This can be true, for example, when the APs 106 are not all build by the same manufacturer. Thus, the MAC prefix can be used as a second order identifier when searching the PPT 120.

If a match is found at decision block 425, at block 430, the server 122 can compare fingerprint data from the unknown AP 130 with fingerprint data in the PPT 120 associated with the subject SSID (e.g., first order identifier) and MAC prefix (e.g., second order identifier).

At decision block 435, if the fingerprint data of the unknown AP 130 matches that fingerprint data stored in the PPT 120, then at block 440, the server 122 or the mobile device 110 can identify or otherwise classify the unknown AP 130 as a trusted AP at block 440.

At decision block 435, if the fingerprint data of the unknown AP 130 does not match the fingerprint data stored in the PPT 120, then at block 445, the server 122 or the mobile device 110 can identify or otherwise classify the unknown AP 130 as a suspicious AP at block 445. The mobile device 110 or the server 122, for example, can perform further analysis to determine whether the unknown AP 130 (suspicious AP) is a rogue AP.

At decision block 415, if the SSID of the unknown AP 130 is not in the PPT 120, then the AP can be identified or otherwise classified as an untrusted AP at block 446. In such a case no information may be known about the unknown AP 130, so it is treated as a new association and fingerprint data can be collected. The fingerprint data can further be shared with the server 122 and/or saved to the PPT 120. In some embodiments, even if there is no SSID match in the PPT 120, the mobile device 110 can perform further evaluation on-device to determine that the unknown AP 130 is a trusted AP. This information can be stored in the PPT 120.

At decision block 425, if the MAC prefix of the unknown AP 130 does not have a match in the PPT 120, the unknown AP 130 can be identified or otherwise classified as an untrusted AP at block 446. This is similar to above. Further information and fingerprint data can be collected and stored regarding the new association. In some embodiments, even if there is no MAC prefix match in the PPT 120, the mobile device 110 can perform further evaluation on-device to determine that the unknown AP 130 is a trusted AP. This information can be stored in the PPT 120.

If the unknown AP 130 is classified as an untrusted AP at block 446, the associated mobile device 110 can implement precautionary or increased security measures prevent data loss or network intrusion by an unauthorized entity. For example, the mobile device 110 can blacklist the untrusted AP (e.g., a WiFi AP) or bar the untrusted cell cower, and thus avoid connecting to it in future. Such access barring or connection avoidance can be implemented for a certain predetermined or adjustable duration of time. The mobile device 110 can also lower the priority of selection for the potentially untrusted AP (e.g., WiFi AP or cell tower/BS) so that all other potentially trusted and available APs 106 are selected first.

The foregoing description of the method 400 is described in terms of the server 122 performing the steps. In some embodiments, the various blocks and steps of the method 400 can also be performed by the mobile device 110a, for example. In some other embodiments, the blocks or steps of the method 400 can be cooperatively performed by the server 122 and the mobile device 110a.

Figure 5:
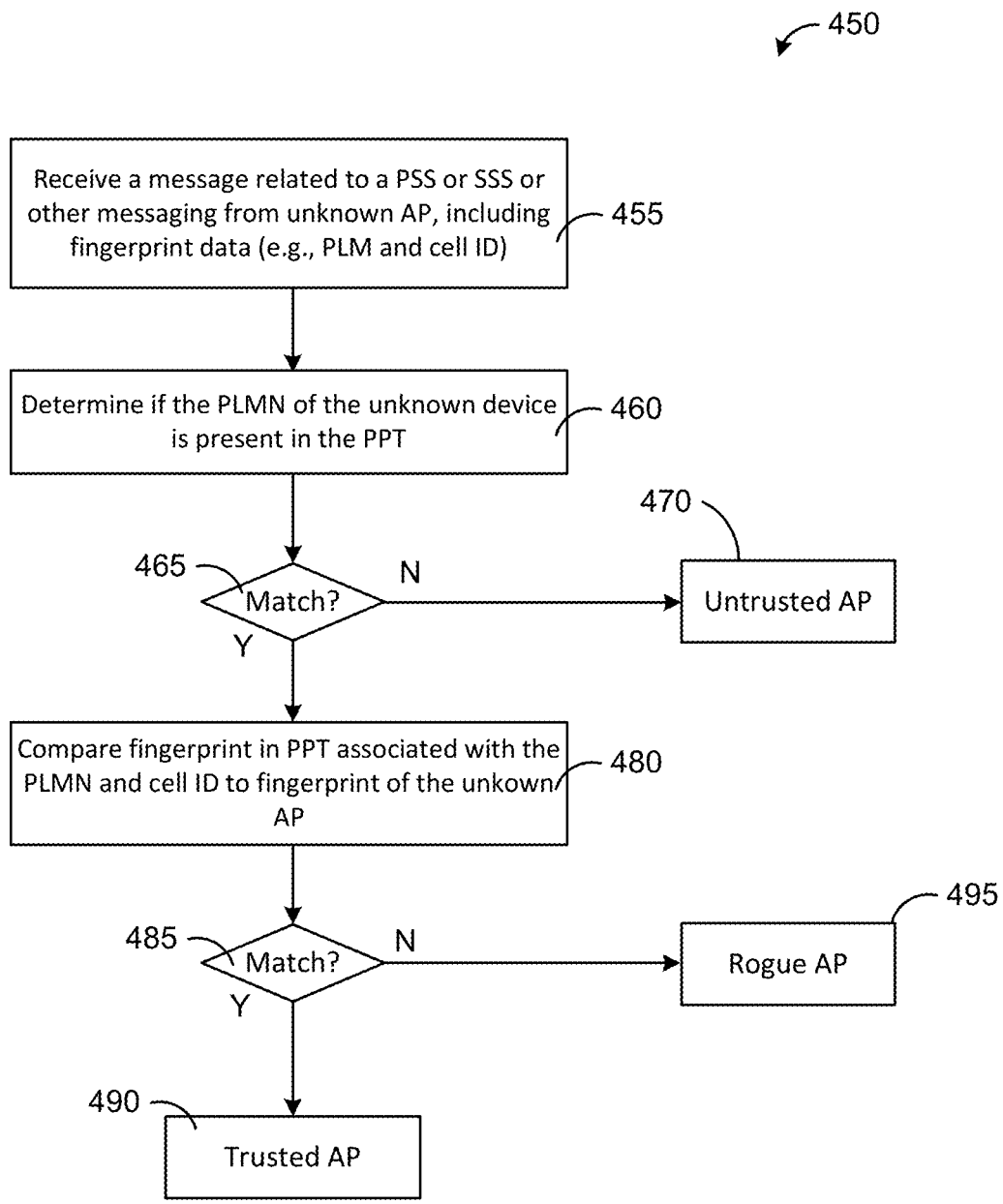
FIG. 5 is a flowchart of another embodiment of a method for identifying a rogue AP using the persistent profile table of FIG. 3.

FIG. 5 is flowchart of an embodiment of a method for identifying a rogue AP using the persistent profile table of FIG. 3. This may be referred to herein as a detection algorithm operable to detect a rogue cellular AP.

A method 450 can begin at block 455 when the mobile device 110a (implemented as a cellular UE, for example), scans for available APs. This can be similar to block 405 of the method 400. The mobile device 110a can receive a PSS and SSS, master information block (MIB), various System information blocks (SIB), and other signals from cellular APs 106. In addition, the "physical layer identity" can be gleaned from the PSS and "physical layer cell identity group" can be gleaned from the SSS.

At block 460, the server 122 can query the PPT 120 to determine if the PLMN for the AP (e.g., a cellular BS) is present in the PPT 120. In the event the unknown AP 130 is a rogue AP, the PLMN may mimic that of the trusted cellular APs (e.g., the APs 106) of the network 108. That is, the unknown AP 130 may have the same PLMN as the trusted APs 106 in the network 108. Thus, the PLMN can be used as a first order identifier in a PPT search.

At decision block 465, if the PLMN is present in the PPT 120 the server 122 can determine if the cell ID of the unknown AP 130 is present in the PPT 120.

If a match is found at decision block 465, at block 480, the server 122 can compare fingerprint data from the unknown AP 130 with fingerprint data in the PPT 120 associated with the subject PLMN and cell ID of the unknown AP 130. Here, the cell ID can be used as a second order identifier in the PPT search.

At decision block 485, if the fingerprint data of the unknown AP 130 matches that fingerprint data stored in the PPT 120, then at block 490, the server 122 or the mobile device 110 can identify or otherwise classify the unknown AP 130 as a trusted AP.

At decision block 485, if the fingerprint data of the unknown AP 130 does not match the fingerprint data stored in the PPT 120, then at block 495, the server 122 or the mobile device 110 can identify or otherwise classify the unknown AP 130 as a rogue AP. The mobile device 110 or the server 122, for example, can perform further analysis to determine whether the unknown AP 130 is a rogue AP. Further analysis can include certain algorithm/logic based detection from all the inputs received, e.g., instead of fingerprint comparison (received fingerprint vs. stored fingerprint), the components of the received fingerprint can be used to compute a good/bad AP, or other input messages from the unknown AP be used to feed a local algorithm.

At decision block 465, if the SSID of the unknown AP 130 is not in the PPT 120, then the AP can be identified or otherwise classified as an untrusted AP at block 470. In such a case no information may be known about the unknown AP 130, so it is treated as a new association and fingerprint data is collected. The fingerprint data can further be shared with the server 122 and/or saved to the PPT 120. In some embodiments, even if there is no PLMN match in the PPT 120, the mobile device 110 can perform further evaluation on-device to determine that the unknown AP 130 is a trusted AP. This information can be stored in the PPT 120.

The foregoing description of the method 450 is described in terms of the server 122 performing the steps. In some embodiments, the various blocks and steps of the method 450 can also be performed by the mobile device 110*a*, for example. In some other embodiments, the blocks or steps of the method 450 can be cooperatively performed by the server 122 and the mobile device 110*a*.

Figure 6:
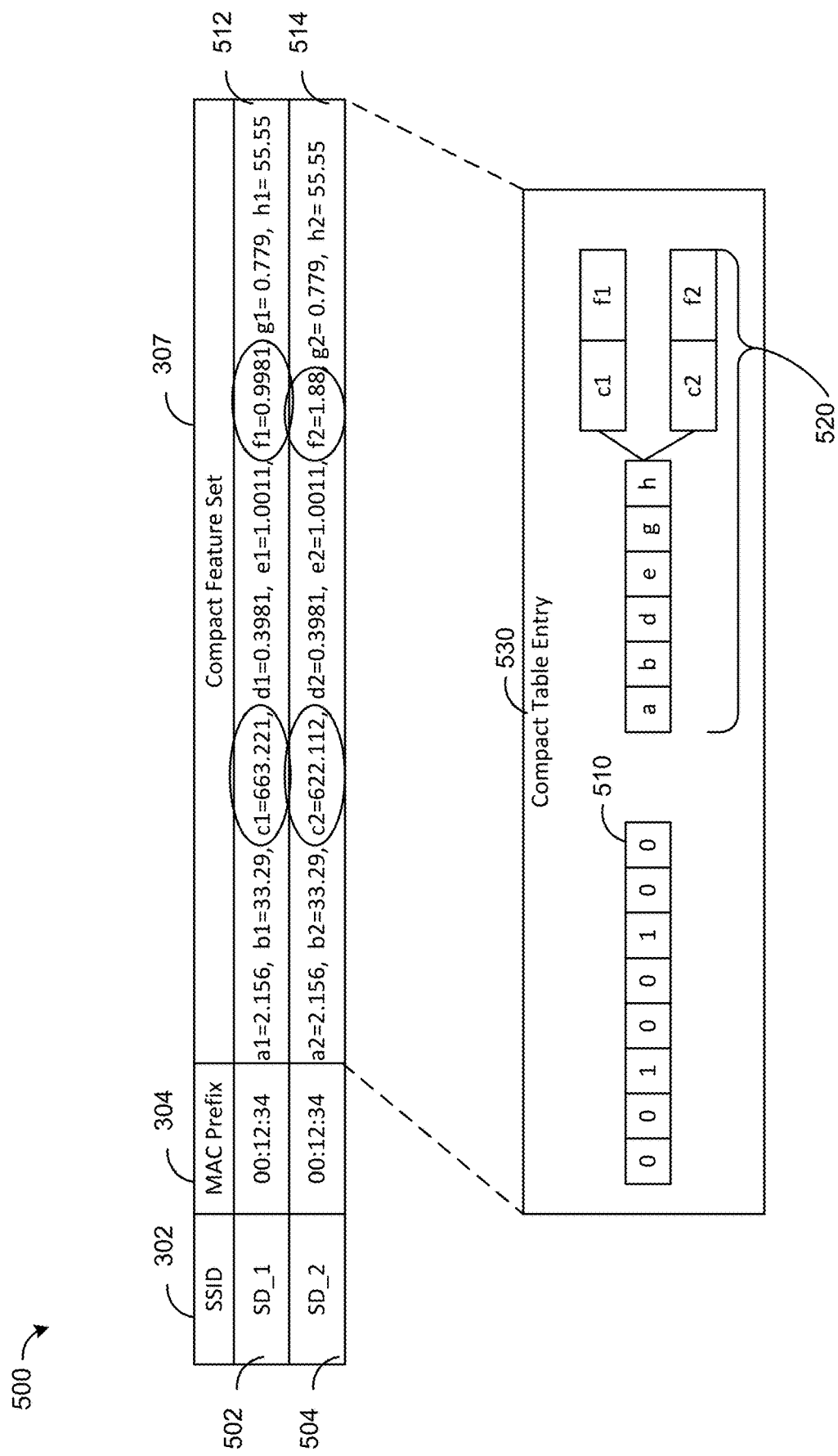
FIG. 6 is a graphical representation of another embodiment of the persistent profile table of FIG. 2.

FIG. 6 is a graphical representation of another embodiment of the persistent profile table of FIG. 2. A table 500 identifies two exemplary clusters, labeled a first entry 502 and a second entry 504. The first entry 502 and a second entry 504 relate to clusters of WiFi APs 106, but the following description is equally applicable to clusters of cellular APs 106 (e.g., BSs). Each entry 502, 504 can also be referred to as a profile table entry or PPT entry. Each of the entries 502, 504 can identify common characteristics among a plurality of APs (e.g., the APs 106) in a network (e.g., the network 108). The entry 502 has an SSID "SD_1" and the entry 504 has an SSID, "SD_2." The APs (e.g., the APs 106) identified by the entries 502, 504 can be made by the same manufacturer, so in this example they have the same MAC prefix 304 (e.g., 11:12:34). In some embodiments, the first entry 502 may be similar to the cluster 0 and the second entry 504 can be similar to the cluster 1 of the office of FIG. 3.

Each of the entries 502, 504 describes eight different (exemplary) features (of the feature set), labeled "a" though "h" (e.g., a, b, c, d, e, f, g, h), with a corresponding "1" or "2", relating the features to the SSID and MAC prefix (e.g., the search key) of the cluster. The SSID can be the first order identifier and the MAC prefix can be the second order identifier for the clusters associated with the entries 502, 504. The features can be organized as a compact feature sets 307 (e.g., FIG. 3). The process illustrated in FIG.>6 (and FIG. 7) is a second level of compression in addition to that described in connection with FIG. 3, for example. The table 500 can provide a way to compress values across cluster compression using an identifier (e.g., the identifier frame 510) that saves the common feature values across clusters once and maintains/saves values for the uncommon feature values per-cluster for each cluster independently. The process illustrated by the table 500 and table 600 (FIG. 6) can also be referred to as inter-cluster compression. In combination with the "compact cluster creation" of FIG. 3, inter-cluster compression can provide a second layer of reduction in memory requirements and allow storage of at least a portion of the PPT 120 on the mobile device 110.

The features a-h make up the feature set 308 for the associated cluster. Thus the entry 502 in the SSID SD_1 has the feature values a1, a1, c1, d1, e1, f1, g1, h1. The entry 502 SD_2 has the feature values a2, b2, c2, d2, e2, f2, g2, h2A compact feature set 512 is associated with the cluster 502, and a compact feature set 514 is associated with the entry 504. The compact feature set 512 and the compact feature set 514 can indicate the common features across the various APs within the respective clusters identified by the entries 502, 504. The values a-h are shown for illustration purposes and are not limiting. Such values can also include floating point values. In the illustrated example a1=a2, b1=b2, d1=d2, e1=e2, g1=g2, and h1=h2. This can also be due to being made by the same manufacturer. The feature differences are present for "c," and "f," where c1 and c2 are different values and f1 and f2 are different values. These different values are indicated by the four ovals shown in FIG. 6. The different values can indicate different operation characteristics of a given AP, such as bandwidth or frequency variations.

In such an example, only one set of values for a, b, d, e, g, and h for both SD_1 and SD_2 may be stored. This may be referred to herein as the compressed feature set 520. The compressed feature set 520 can have a single value for the values common to multiple clusters, and then save the distinct features separately. Thus, memory space equivalent to six (e.g., the common values) out of eight total floating point storage locations can be avoided, saving approximately 40 percent memory over saving all of the values. Therefore, in some embodiments, the clusters associated with entries 502, 504 can be compact enough to store or cache on the mobile device 110*a*, for example. Accordingly, relevant portions of the PPT 120 may be readily available onboard the mobile device 110*a* by storing the compressed feature set 520, instead of all values and characteristics of all of the APs. This can compress the amount of memory required to store fingerprint data related to multiple clusters having similar fingerprint data. In some embodiments, the compressed feature set 520 can be a unified storage of the common operating characteristics and features across a set of clusters, or more specifically, each cluster identified in the compact table entry. The compressed feature set 520 can further include uncommon operating characteristics and features, stored individually for the same set of clusters, or each cluster identified in the compact table entry.

In some embodiments, the search keys (e.g., the SSID and MAC prefix or first order identifier and second order identifier) for two different feature sets or fingerprints may be unique. Thus, two clusters having similar feature sets (that can be compacted using the disclose methods) can have distinct search keys, or different SSIDs/MAC prefixes.

In some embodiments, the various fingerprints or feature sets can be compressed using one or more approaches. For example, the server 122 can group the APs according to one or more first, second, third, etc. order identifiers: 1) across same MAC prefix with same SSID, 2) across the same MAC prefix but different SSID in a nearby geographical region, 3) across then same MAC prefix but in a wider geographic region, and 4) across a different MAC prefix but very close geographic region.

In other embodiments implementing cellular communications, servers can group using PLMNs using various criteria. For example, PLMNs can be grouped if they have the same location/tracking area codes in the neighboring geographical regions, same frequency bands in the neighboring geographical regions, the same reselection priorities in the neighboring geographical regions, or by PLMNs in a geographically neighboring area.

As the feature values are grouped and compacted, and the repeated or common values (e.g., a, b, d, e, g, and h for both SD_1 and SD_2) are saved only once, an identifier frame 510 may be present to map the compressed values. This can allow the device to later decompress the compressed feature set 520 when needed. In some embodiments, the identifier frame 510 indicates a number of blocks (e.g., eight blocks) corresponding to the number (e.g., eight) of stored features of the feature vector. A "0" (zero) appears in the blocks that indicate a common feature (a, b, d, e, g, and h) and a "1" for the different values (c and f). The mobile device 110 can search for the SSID 302 (first order ID) and MAC prefix 304 (second order ID) of the unknown AP 130 in the PPT 120, for example. Then the mobile device 110 can use the associated identifier frame 510 to decompress and retrieve the appropriate fingerprint data for a desired AP (e.g., the unknown AP 130). The identifier 510 and the compressed feature set 520 can be saved together in the PPT 120 as a compact table entry 530 referenced to an associated SSID and MAC prefix. Accordingly, the fingerprints 512, 514 can be compressed within the PPT 120 by grouping the clusters and saving repeated values only once.

In some examples, the identifier frame 510 may increase overhead slightly by a number of bits equal to the number of features in the feature set 308. In this example the overhead incurred by the identifier frame 510 is eight bits. However, the memory savings provided by the disclosed method far outweighs the overhead incurred using the identifier frame 510. In some embodiments, fingerprints having same number and type of features across the fingerprints in the group may be grouped together, reducing memory requirements to store the data.

In an embodiment, the mobile device 110 can to identify the compact table entry 530 (e.g., the compressed fingerprint data), having the SSID and MAC prefix associated with the search key. Then the mobile device 110 can use the identifier frame 510 to decompress the compressed feature set 520. The mobile device 110 can reference the identifier frame 510 to determine which of the feature values has been compressed. When the mobile device 110a encounters a "1", the uncompressed value can be selected from the rest of the compact table entry 530.

The entries 502, 504 can be managed or modified within the PPT 120 by the server 122, for example. Thus, the processes described in connection with FIG. 6, including grouping similar APs 106 into clusters, and further simplifying the PPT entries by combining PPT entries identifying clusters having similar feature sets, can be performed or otherwise executed by the server 122 within the PPT 120. In some embodiments, the processes associated with FIG. 6 can be performed by the mobile device 110 in cooperation with the server 122, or by the mobile device 110 alone.

Figure 7:
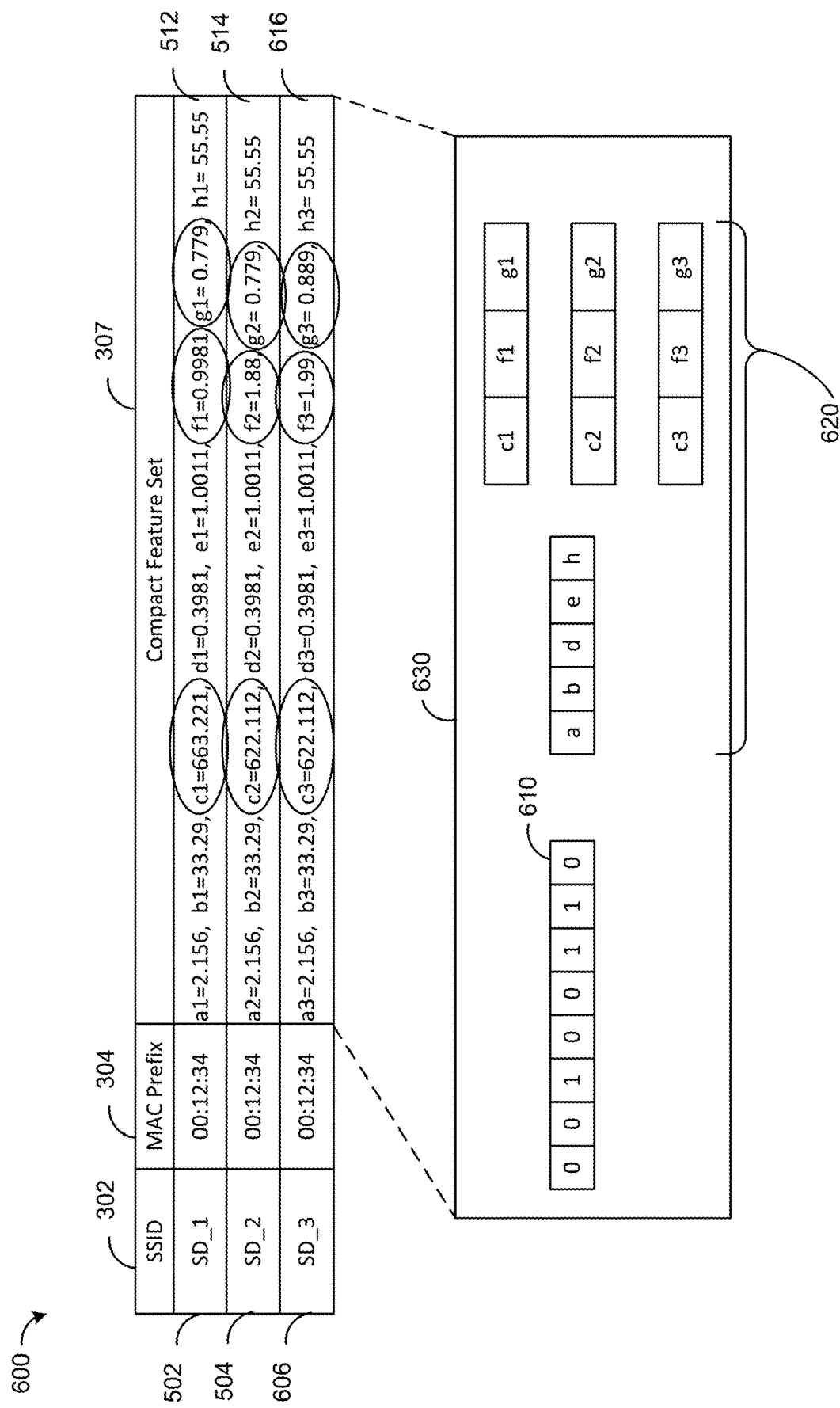
FIG. 7 is a graphical representation of another embodiment of the persistent profile table of FIG. 5.

FIG. 7 is a graphical representation of another embodiment of the persistent profile table of FIG. 6. Similar to the table 500, a table 600 can represent a listing of SSID and MAC prefixes (e.g., the search keys) or PLMNs and cell IDs for multiple clusters with their associated fingerprint data. More than two fingerprints can be compacted in certain cases by allowing partial duplication of un-compacted feature values. As shown the compact feature set 512 and the compact feature set 514 can be combined with a third compact feature set 616 for the cluster 606. The cluster 606 can have eight features with slightly different floating point values for some features. For example, the value for c3 may be the same as c2, but different from c1. The value f3 can be different than f2 and f1. The value g3 can be different from g1 and g2, but g1 and g2 may be the same. The feature values for all three clusters 502, 504, 606 can be compacted into a compressed feature set 620, similar to the process described above. These different values are indicated by the ovals shown in FIG. 7.

For example, the values a, b, d, e, h are the same for the clusters 502, 504, 606, but the values for the features c, f, and g are not universally common. An identifier frame 610 can be included to identify the common values, again with a "0" and the disparate values with a "1." The significance of a 1 and 0 in the identifier frame 610 is not limiting and can be reversed as needed. The compressed feature set 620 can be combined with the identifier frame 610 to form a compact table entry 630, similar to the compact table entry 530, for simplified storage in the PPT 120.

In order to compact the features shown in the table 600, a union set can be formed from the differences between the feature sets. Even though the values of feature 'g' is same between SD_1 and SD_2, these values may not be compacted. In some examples, they can be kept in an un-compacted part of the PPT 120. Even though the values for g remain uncompacted or uncompressed, the compression efficiency is still higher overall through the inclusion of SD_3 into the compressed feature set 620 {SD_1, SD_2, SD_3}.

In another embodiment, the compressed feature set can include recursive compaction, in which the two subsets {c1, f1, g1} and {c2, f2, g2} are individually stored. This can require a new Identifier frame 610 for the subset and may add some complexity.

Due to the compression provided by the compact table entry 530 and the compact table entry 630, portions of the vast amounts of data stored within the PPT 120 can be efficiently stored onboard the mobile device 110a, for example, in local memory. Ordinarily, is not possible to store the PPT 120 within the mobile device 110 if the PPT 120 contains billions of AP fingerprint entries. This may result in time- and process-intensive operations, repeated querying the PPT 120 via the server 122, for example. Decentralizing the storage or prefetching a relevant portion of the PPT 120 may simplify such queries and make fingerprint data more readily available to the mobile device 110a. Thus, portions of the PPT 120 can be prefetched based on the location of the mobile device 110a. In some embodiments, the mobile device 110a can also request a prefetch for data associated with locations in which the mobile device 110a expects to be located in, for example, the immediate future or within a few hours.

In some embodiments, the search order used for grouping the fingerprints for compaction/compression can be done in one or more ways. For example, the search can proceed across same MAC prefixes with the same SSID (or the same PLMN). Second the search can proceed across the same MAC prefix with different SSIDs in a nearby or predetermined geographical region. Third, the search can proceed across the same MAC prefix (or PLMN) in a wider geographic region. Fourth, the search can proceed across different MAC prefixes (or PLMNs) but within a very close geographic region. The order of the search is performed based at least in part on geographical location. This grouping for compaction enables maximum efficiency since all APs that are geographically nearby can be considered for grouping (or clustering), first based on same MAC prefix (or PLMN), making speculative prefetching highly effective as a wireless mobile device 110 is most likely to visit the nearby geographical location and connect to access points around the same geographical location. The fingerprint data can then be transmitted to the mobile device 110a in a compressed or compacted state and stored locally. If the PPT 120 stores the fingerprint data in an uncompressed or uncompacted form, then the uncompacted fingerprint data can be forwarded to the mobile device 110a and compressed for more efficient local storage in memory.

Figure 8:
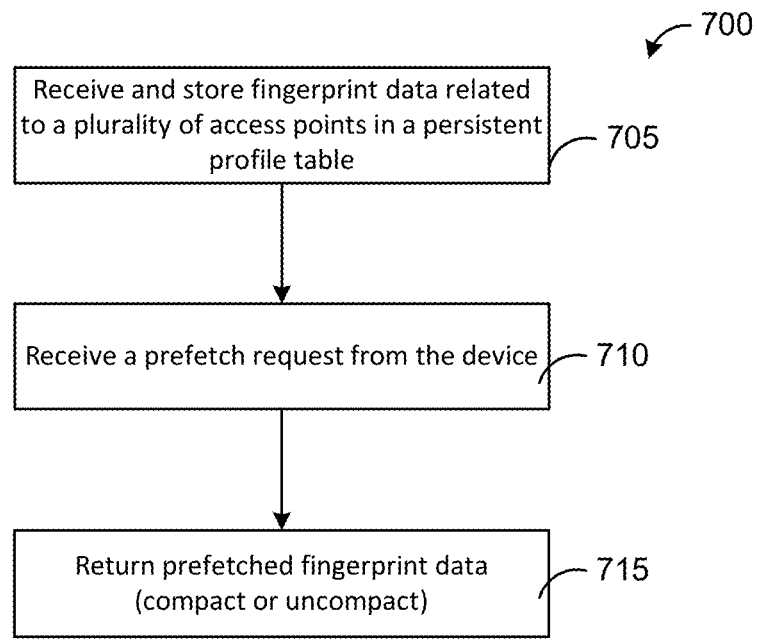
FIG. 8 is a flowchart of an embodiment of a method for storing fingerprint data locally.

FIG. 8 is a flowchart of an embodiment of a method for storing fingerprint data locally. A method 700 can be performed by the mobile device 110a when entering a new geographic location, for example. At block 705, the server 122 can receive and store fingerprint data related to a plurality of APs 106 in the PPT 120. These data can be related to many thousands or even billions of APs 106. In a WiFi embodiment, the PPT 120 can store the fingerprint data in an uncompressed form, having each feature value (e.g., the uncompressed/uncompact fingerprint data), SSID, and MAC address (or MAC prefix) stored in its full form. In some embodiments, the PPT 120 can store the fingerprint data in the compressed, or compact form, as described in connection with the table 500 and the table 600. In cellular embodiments, the PPT 120 can store the fingerprint data, such as the PLMN and cell ID in addition to other fingerprint data in an uncompressed form. The fingerprint data for a cellular BS can include, for example, different system parameters found in the MIB and the SIB, a list of neighboring BSs or cell towers, the operating frequency bands, physical cell ID, latitude/longitude/location information, tracking or location area codes, reselection priority values, values in the PSS and SSS, information related to signal strength and characteristics, modulation, frequency, etc. These items can be same for multiple cell towers/BSs, each with different cell ID's, but with the same PLMN code. These same valued features can allow increased compaction or compression.

At block 710, the server 122 can receive a prefetch request from the mobile device 110a. For example, as the mobile device 110a enters a new environment or geographic location, it may need to reference fingerprint data for the APs 106 in the local area, that are not continuously stored locally. Accordingly, the prefetch request can include a geographical reference (e.g., a GPS location) that can indicate to the server 122 which and how much fingerprint data to provide.

At block 715, the prefetch request can be fulfilled by the server and transmit fingerprint data for the requested location. In some embodiments, the data returned to the mobile device 110 in block 715 can be both compact according to FIG. 3 and compressed according to FIG. 6 or FIG. 7. In some embodiments, the data returned to the mobile device 110 can also be one of compact (FIG. 3) or compressed (FIG. 5, FIG. 6). The server 122 can then return fingerprint data from the PPT 120 using the compression methods described in connection with the table 500 and the table 600. For example, the server can return uncompressed form of fingerprints that the mobile device 110 can compress and then store on-device using compressed form. The server 122 can directly return data in compressed form that can be directly stored on-device. The server 122 can also store fingerprint data in the compact form and return data to the mobile device 110 in compressed or compact form. In embodiments in which the PPT 120 stores the fingerprint data in the uncompressed or uncompacted form, the mobile device 110a can perform the compaction processes described in connection with the table 400 and the table 500.

In embodiments in which the PPT 120 stored fingerprint data in the compacted form, the mobile device 110a need only decompress the compacted data when needed (e.g., for rogue AP detection). In some other embodiments at least a portion of the PPT 120 can be stored in the mobile device 110a and read directly without decompression from the form described above in connection with FIG. 6 and FIG. 7.

Figure 9:
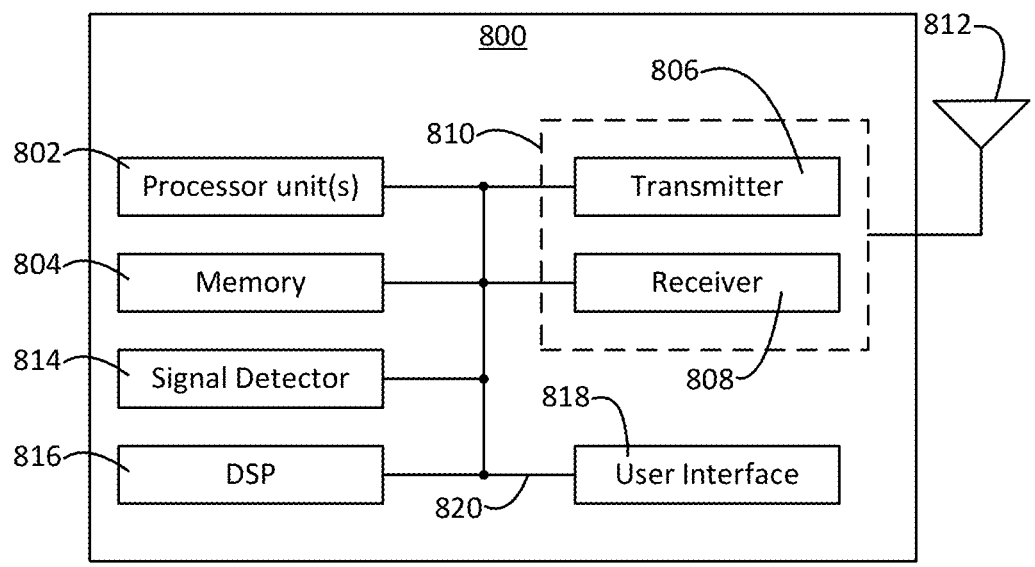
FIG. 9 is a functional block diagram of a device for use in the system of FIG. 1.

FIG. 9 is a functional block diagram of a device for use in the system of FIG. 1. A device 800 can be implemented as one or more of the mobile devices 110 and/or the APs 106. In some embodiments, the device 800 can also be implemented as the server 122, with unneeded elements eliminated. The device 800 can further be used to perform various functions associated with the mobile device 110 and the APs 106. The device 800 can also perform the steps of the method 400 for detection of a rogue AP.

The device 800 can have a processor 802. The processor 802 can control operation of the device 800. The processor 802 may also be referred to as a central processing unit (CPU). The processor 802 can also be implemented as one or more processors or microprocessors.

The device 800 may further include a memory 804 operably coupled to the processor 802. The memory 804 can include both read-only memory (ROM) and random access memory (RAM), providing instructions and data to the processor 802. The processor 803 can read data from, and write data to the memory 804. A portion of the memory 804 may also include non-volatile random access memory (NVRAM). The processor 802 can perform logical and arithmetic operations based on program instructions stored within the memory 804. The instructions in the memory 804 may be executable to implement the methods described herein. In embodiments where the device 800 is implemented as the mobile devices 110, the memory 804 can be an onboard memory within the mobile device 110. In embodiments where the device 800 is implemented as the server 122, the memory 804 can be implemented as the PPT 120.

When the device 800 is implemented or used as a mobile device 110, the processor 802 may be operable to process information from of a plurality of different signal types, received from, for example, the APs 106. In such an embodiment, the device 800 may receive signals from the APs 106 and save fingerprint data to the memory 804. For example, the processor 802 may be configured to determine the values for various features or feature sets, for later transmission to the PPT 120. The processor 802 can further execute instructions based on information received from the PPT 120 via the server 122, for example.

When the device 800 is implemented as the server 122, the processor 802 can read and write information to the PPT 120 (e.g., memory 804). While the mobile device 110 or the server 122 are referenced as the components responsible for the performance of the method 400, the processor 802 may actually be performing the functions attributed to the mobile device 110 or the server 122.

The processor 802 may comprise or be a component of a processing system implemented with one or more processors 802. The one or more processors 802 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 802 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 802, cause the processing system to perform the various functions described herein.

The device 800 may also include a housing that may include a transmitter 806 and a receiver 808 to allow transmission and reception of data between the device 800 and a remote location. For example, such communications may occur between the mobile device 110, the APs 106, and the server 122. The transmitter 806 and receiver 808 may be combined into a transceiver 810. An antenna 812 may be attached to the housing and electrically coupled to the transceiver 810, or to the transmitter 806 and the receiver 808 independently. The device 800 may also include (not shown) multiple transmitters, multiple receivers, multiple transceivers, and/or multiple antennas.

The device 800 may also include a signal detector 814 that may be used in an effort to detect and quantify the level of signals received by the transceiver 810. The signal detector 814 may detect such various signal characteristics (e.g., the features and feature values) that make up the fingerprint data.

The device 800 may also include a digital signal processor (DSP) 816 for use in processing signals. The DSP 816 may be configured to generate a data unit for transmission. The DSP 816 may further cooperate with the signal detector 814 and the processor 802 to determine certain fingerprint data in signals arriving at the mobile devices 110 from the APs 106, for example.

The device 800 may further comprise a user interface 818 in some aspects. The user interface 818 may comprise a keypad, a microphone, a speaker, and/or a display. The user interface 818 may include any element or component that conveys information to a user of the device 800 and/or receives input from the user.

The various components of the device 800 described herein may be coupled together by a bus system 820. The bus system 820 may include a data bus, for example, as well as a power bus, a control signal bus, and a status signal bus in addition to the data bus. Those of skill in the art will appreciate the components of the device 800 may be coupled together or accept or provide inputs to each other using some other mechanism.

Although a number of separate components are illustrated in FIG. 9, one or more of the components may be combined or commonly implemented. For example, the processor 802 may be used to implement not only the functionality described above with respect to the processor 802, but also to implement the functionality described above with respect to the signal detector 814 and/or the DSP 818. Further, each of the components illustrated in FIG. 9 may be implemented using a plurality of separate elements. Furthermore, the processor 802 may be used to implement any of the components, modules, circuits, or the like described below, or each may be implemented using a plurality of separate elements.

Those of skill will appreciate that the various illustrative logical blocks (e.g., the various servers described herein), modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the disclosure. In addition, the grouping of functions within a module, block or step is for ease of description. Specific functions or steps can be moved from one module or block without departing from the disclosure.

The various illustrative logical blocks and modules (e.g., the various servers described herein) described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

What is claimed is:

1. A method for communication among a wireless mobile device and a plurality of access points, the method comprising:
    receiving at a server, and storing to a memory, identification data related to a plurality of known access points, the identification data for each known access point of the plurality of known access points including a first order identifier, a second order identifier, and feature set data representing one or more operating characteristics;
    clustering, by the server, the identification data as a plurality of clusters based on a commonality of the first order identifier, and a commonality of at least a portion of the second order identifier;
    generating, at the server, a compact feature set for each cluster of the plurality of clusters in the memory based on the feature set data of the known access points within individual clusters, the compact feature set, for each cluster, representative of the one or more operating characteristics that are common across feature set data of the known access points within each respective cluster;

storing, at the server, a representation of common compact feature sets across clusters as a compact table entry having an identifier frame indicating, for each of the one or more operating characteristics, whether the operating characteristic has a same value or different value among the known access points in each cluster, and a compressed feature set indicating, for each of the one or more operating characteristics that have the same value, only a single instance of the same value of the operating characteristic, and, for each of the one or more operating characteristics that have different values, all of the different values of the operating characteristic among the known access points in each cluster;

receiving, at the server, a prefetch request from the wireless mobile device identifying a new geographic location; and providing the wireless mobile device identification data related to access points in the new geographic location, wherein the identification data is based at least upon the compact feature sets.

2. The method of claim 1 wherein the classifying further comprises:

grouping the identification data for each of the plurality of known access points into groups based on the first order identifiers of the plurality of known access points; and within the groups based on the first order identifiers of the plurality of known access points, further grouping the identification data for each of the plurality of known access points into groups based on at least a portion of the second order identifiers of the plurality of known access points.

3. The method of claim 1 wherein the first order identifier comprises a service set identifier (SSID) and the second order identifier comprises a media access control (MAC) address.

4. The method of claim 1 wherein the first order identifier comprises a public land mobile network (PLMN) and the second order identifier comprises a cell identifier (cell ID).

5. The method of claim 4 wherein the at least a portion of the second order identifier comprises a MAC prefix having a first three bytes of a MAC address.

6. The method of claim 1 wherein the providing comprises, transmitting one or more clusters and associated compact feature entries associated with the access points in the new geographic location.

7. The method of claim 1 wherein the providing comprises, transmitting one or more clusters and associated compact feature sets associated with the access points in the new geographic location.

8. A device for communication among a wireless mobile device and a plurality of access points, the device comprising:

a memory operable to store identification data related to a plurality of known access points, the identification data for each known access point of the plurality of known access points including a first order identifier, a second order identifier, and feature set data representing one or more operating characteristics; and one or more processors communicatively coupled to the memory and operable to, cluster the identification data as a plurality of clusters based on a commonality of the first order identifier, and a commonality of at least a portion of the second order identifier, generate a compact feature set for each cluster of the plurality of clusters in the memory based on a commonality of the one or more operating characteristics represented by the feature set data of the known access points within individual clusters, store a representation of common compact feature sets across clusters as a compact table entry having an identifier frame indicating, for each of the one or more operating characteristics, whether the operating characteristic has a same value or different value among the known access points in each cluster, and a compressed feature set indicating, for each of the one or more operating characteristics that have the same value, only a single instance of the same value of the operating characteristic, and, for each of the one or more operating characteristics that have different values, all of the different values of the operating characteristic among the known access points in each cluster, receive a prefetch request from the wireless mobile device identifying a new geographic location, and provide the wireless mobile device identification data related to access points in the new geographic location, wherein the identification data is based at least upon the compact feature sets.

9. The device of claim 8 wherein the one or more processors are further operable to:

group the identification data for each of the plurality of known access points into groups based on the first order identifiers of the plurality of known access points; and within the groups based on the first order identifiers of the plurality of known access points, further grouping the identification data for each of the plurality of known access points into groups based on at least a portion of the second order identifiers of the plurality of known access points.

10. The device of claim 8 wherein the first order identifier comprises a service set identifier (SSID) and the second order identifier comprises a media access control (MAC) address.

11. The device of claim 8 wherein the first order identifier comprises a public land mobile network (PLMN) and the second order identifier comprises a cell identifier (cell ID).

12. The device of claim 11 wherein the at least a portion of the second order identifier comprises a MAC prefix having a first three bytes of a MAC address.

13. The device of claim 8 wherein the one or more processors are further operable to transmit one or more clusters and associated compact feature entries associated with the access points in the new geographic location.

14. The device of claim 8 wherein the one or more processors are further operable to transmit one or more clusters and associated compact feature sets associated with the access points in the new geographic location.

15. A non-transitory computer-readable medium in a communications system for communications among a wireless mobile device and a plurality of access points comprising instructions that when executed by a processor, cause a computer to:

receive identification data related to a plurality of known access points, the identification data for each known access point of the plurality of known access points including a first order identifier, a second order identifier, and feature set data representing one or more operating characteristics;

cluster the identification data as a plurality of clusters based on a commonality of the first order identifier, and a commonality of at least a portion of the second order identifier;

generate a compact feature set for each cluster of the plurality of clusters in the memory based on a commonality the one or more operating characteristics represented by the feature set data of the known access points within individual clusters;

store a representation of common compact feature sets across clusters as a compact table entry having
  an identifier frame indicating, for each of the one or more operating characteristics, whether the operating characteristic has a same value or different value among the known access points in each cluster, and
  a compressed feature set indicating,
    for each of the one or more operating characteristics that have the same value, only a single instance of the same value of the operating characteristic, and,
    for each of the one or more operating characteristics that have different values, all of the different values of the operating characteristic among the known access points in each cluster;

receive a prefetch request from the wireless mobile device identifying a new geographic location;

provide the wireless mobile device identification data related to access points in the new geographic location, wherein the identification data is based at least upon the compact feature sets.

16. The non-transitory computer-readable medium of claim 15 comprising instructions that further cause the computer to:
  group the identification data for each of the plurality of known access points into groups based on the first order identifiers of the plurality of known access points; and
  within the groups based on the first order identifiers of the plurality of known access points, further grouping the identification data for each of the plurality of known access points into groups based on at least a portion of the second order identifiers of the plurality of known access points.

17. The non-transitory computer-readable medium of claim 15 wherein the first order identifier comprises a service set identifier (SSID) and the second order identifier comprises a media access control (MAC) address.

18. The non-transitory computer-readable medium of claim 15 wherein the first order identifier comprises a public land mobile network (PLMN) and the second order identifier comprises a cell identifier (cell ID).

19. The non-transitory computer-readable medium of claim 18 wherein the at least a portion of the second order identifier comprises a MAC prefix having a first three bytes of a MAC address.

20. The non-transitory computer-readable medium of claim 15 comprising instructions that further cause the computer to transmit one or more clusters and associated compact feature entries associated with the access points in the new geographic location.

21. The non-transitory computer-readable medium of claim 15 comprising instructions that further cause the computer to transmit one or more clusters and associated compact feature sets associated with the access points in the new geographic location.

22. A method for communication among a wireless mobile device and a plurality of access points, the method comprising:
  transmitting a request from the wireless mobile device to a server identifying a new geographic location;
  receiving identification data related to a plurality of known access points associated with the new geographic area from the server, the identification data being compressed and grouped as
    a plurality of clusters based on a commonality of a first order identifier, and a commonality of at least a portion of a second order identifier of the plurality of known access points, and
    at least one compact table entry associated with the plurality of clusters, the at least one compact table entry having
      an identifier frame indicating, for each of the one or more operating characteristics, whether the operating characteristic has a same value or different value among the known access points in each cluster, and
      a compressed feature set indicating,
        for each of the one or more operating characteristics that have the same value, only a single instance of the same value of the operating characteristic, and,
        for each of the one or more operating characteristics that have different values, all of the different values of the operating characteristic among the known access points in each cluster;
  identifying a suspect access point in the new geographic area, the suspect access point being unknown to the mobile device;
  comparing a first order identifier of the suspect access point, at least a portion of a second order identifier of the suspect access point, and a representation of one or more operating characteristics associated with the suspect access point identification data; and
  identifying the suspect access point as a trusted access point based on the comparing.

23. The method of claim 22 wherein the first order identifier comprises a service set identifier (SSID) and the second order identifier comprises a media access control (MAC) address.

24. The method of claim 22 wherein the first order identifier comprises a public land mobile network (PLMN) and the second order identifier comprises a cell identifier (cell ID).

25. The method of claim 24 wherein the at least a portion of the second order identifier comprises a MAC prefix having a first three bytes of a MAC address.

26. The method of claim 22 wherein the mobile device stores the compressed identification data in the same compressed form as the server.

* * * * *